(12) United States Patent
Yadavalli

(10) Patent No.: US 12,547,549 B2
(45) Date of Patent: Feb. 10, 2026

(54) VIRTUAL MEMORY PAGING SYSTEM AND TRANSLATION LOOKASIDE BUFFER WITH PAGELETS

(71) Applicant: ONNIVATION LLC, San Jose, CA (US)

(72) Inventor: Sitaram Yadavalli, San Jose, CA (US)

( * ) Notice: Subject to any disclaimer, the term of this patent is extended or adjusted under 35 U.S.C. 154(b) by 0 days.

(21) Appl. No.: 18/692,192

(22) PCT Filed: Jun. 5, 2023

(86) PCT No.: PCT/US2023/024483
§ 371 (c)(1),
(2) Date: Mar. 14, 2024

(87) PCT Pub. No.: WO2023/239671
PCT Pub. Date: Dec. 14, 2023

(65) Prior Publication Data
US 2025/0094356 A1    Mar. 20, 2025

Related U.S. Application Data

(60) Provisional application No. 63/349,453, filed on Jun. 6, 2022.

(51) Int. Cl.
*G06F 12/00* (2006.01)
*G06F 12/0802* (2016.01)
*G06F 12/1027* (2016.01)

(52) U.S. Cl.
CPC ...... *G06F 12/1027* (2013.01); *G06F 12/0802* (2013.01)

(58) Field of Classification Search
CPC ............. G06F 12/1027; G06F 12/0802; G06F 12/0607; G06F 12/1009; G06F 12/0223; G06F 12/1491
See application file for complete search history.

(56) References Cited

U.S. PATENT DOCUMENTS

| | | | |
|---|---|---|---|
| 6,412,056 B1 * | 6/2002 | Gharachorloo | G06F 12/1027 711/202 |
| 10,133,675 B2 | 11/2018 | Hansson | |
| 10,447,728 B1 | 10/2019 | Steinberg | |
| 2006/0206687 A1 | 9/2006 | Vega | |
| 2006/0282644 A1 | 12/2006 | Wong | |
| 2009/0182976 A1 | 7/2009 | Agesen | |
| 2012/0331265 A1 | 12/2012 | Rozario | |
| 2013/0132704 A1 * | 5/2013 | Ware | G06F 12/04 711/206 |

(Continued)

Primary Examiner — Shawn X Gu

(57) ABSTRACT

A page in a memory is sectioned into a plurality of pagelets (sub-pages) of sizes smaller than the page to speed up data transfers. The pagelets in the page are used to store, transport and process data, wherein individual pagelets are transferred between a memory and a secondary storage or transferred between a memory and a network via a network interface. Pagelets may be transferred in an order that prioritizes the transfer of critical chunks of data as demanded by an agent. Pagelets of a page share one entry in a page table that also includes a virtual to physical translation. A pagelet translation lookaside buffer that handles pages having pagelets is used to cache frequently used translations and a critical pagelet determiner is used to indicate the critical pagelet involved in a transaction.

27 Claims, 18 Drawing Sheets

(56) References Cited

U.S. PATENT DOCUMENTS

| | | |
|---|---|---|
| 2014/0089572 A1 | 3/2014 | Koka |
| 2015/0248554 A1 | 9/2015 | Dumitru |
| 2015/0356023 A1 | 12/2015 | Peter |
| 2016/0140048 A1 | 5/2016 | Mukherjee |
| 2016/0283396 A1 | 9/2016 | Ter-Grigoryan |
| 2017/0123996 A1 | 5/2017 | Kishan |
| 2017/0212843 A1 | 7/2017 | Agesen |
| 2017/0308484 A1 | 10/2017 | Lutas |
| 2020/0394065 A1 | 12/2020 | Bak |
| 2022/0075733 A1 | 3/2022 | Lea |

\* cited by examiner

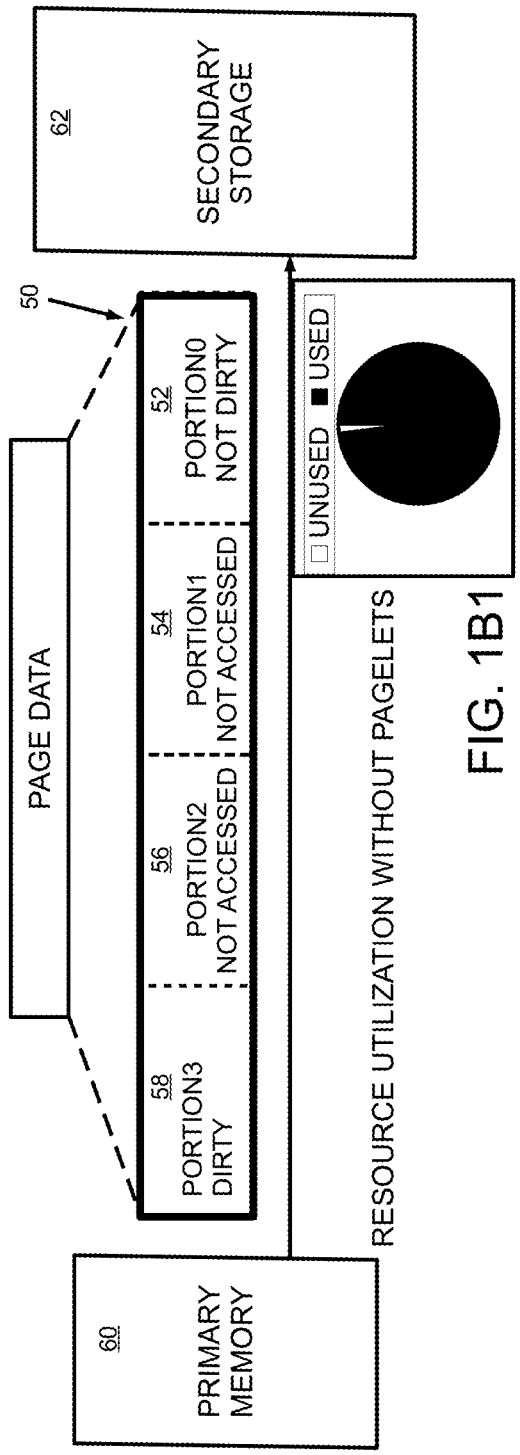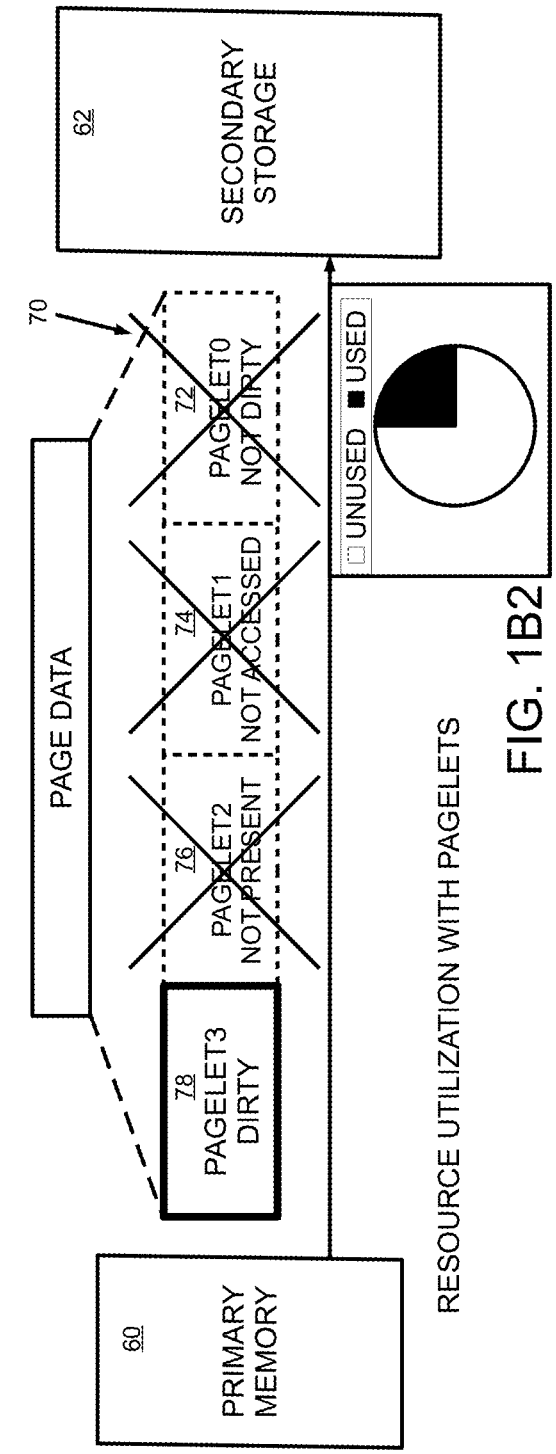

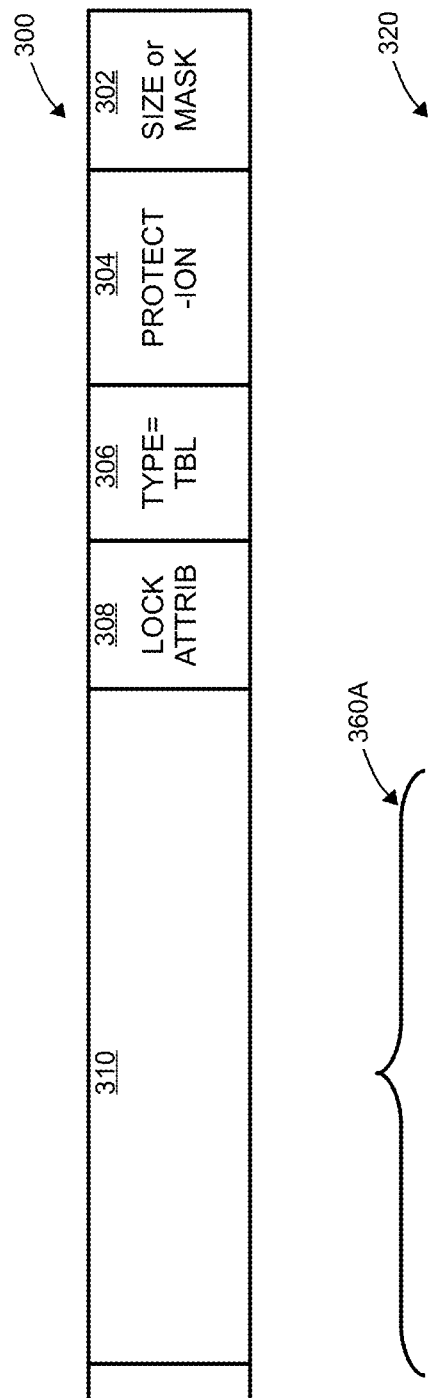
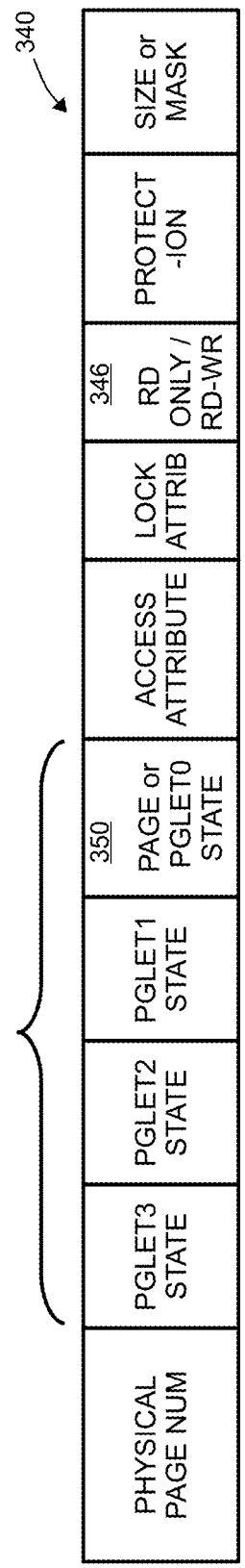
FIG. 3A
FIG. 3B

| PAGELET STATE ACRONYM | PAGELET STATE | DESCRIPTION |
|---|---|---|
| PNP | PAGELET NOT PRESENT | PAGELET NOT PRESENT IN PRIMARY MEMORY |
| PPNA | PAGELET PRESENT, NOT ACCESSED | PAGELET PRESENT IN PRIMARY MEMORY BUT NOT ACCESSED YET |
| PAND | PAGELET ACCESSED, NOT DIRTY | PAGELET PRESENT IN PRIMARY MEMORY AND ACCESSED BUT NOT MODIFIED |
| PD | PAGELET DIRTY | PAGELET PRESENT IN PRIMARY MEMORY BUT WAS WRITTEN TO AND MODIFIED |

FIG. 4A

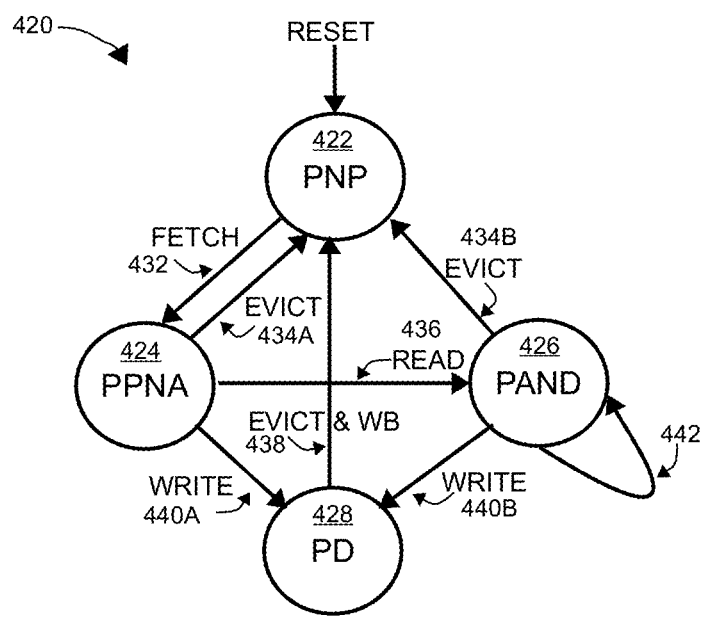

FIG. 4B

VIRTUAL MEMORY PAGING SYSTEM AND TRANSLATION LOOKASIDE BUFFER WITH PAGELETS

CROSS-REFERENCE TO RELATED APPLICATIONS

The present application is a U.S. National Stage Patent Application Entry claiming priority from PCT Application No. PCT/US2023/024483 titled "VIRTUAL MEMORY PAGING SYSTEM AND TRANSLATION LOOKASIDE BUFFER WITH PAGELETS" filed on Jun. 5, 2023 which claims benefit of priority to U.S. Provisional Application No. U.S. 63/349,453 titled "VIRTUAL MEMORY PAGING AND TRANSLATION LOOKASIDE BUFFER WITH PAGELETS" filed on Jun. 6, 2022, all of which applications are hereby incorporated by reference in their entireties.

FIELD OF THE INVENTION

The present disclosure generally relates to implementation of virtual memory, page tables involving pagelets, paging methods involving pagelets, translation lookaside buffer handling pages with pagelets, methods to use a pagelet translation lookaside buffer in a computing system, and the use of pagelets in memory management.

BACKGROUND OF THE INVENTION

Traditional computing systems of various kinds use virtual memory systems having virtual pages for memory access by a processing unit. Typically, in the more recent computing systems these virtual pages are of sizes 4 KB to as large as several megabytes. Data in virtual pages reside in actual physical pages of physical memory in a computing system. Virtual memory systems allow the use and sharing of the same physical memory resources by different processes to proceed with their respective computations by translating their respective virtual memory addresses to corresponding physical memory addresses to access the data. This translation is provided using page tables, often working in collaboration with a translation lookaside buffer (TLB) that allow translation of a virtual page address to a corresponding physical page address (and sometime vice versa) and involves churning of pages in the physical memory. The order of locating pages located in the physical memory may not match the order of virtual pages in a process or system's virtual memory space. Pages of a process that do not reside in a system's physical memory such as a primary memory or a main memory or a graphics memory or a cache memory are allowed to reside on a secondary storage that is typically an order of magnitude slower than any physical memory. The physical memory may comprise system memory, graphics memory, IO buffers, memory used by accelerators and machine learning and/or neural processing units or any memory used as a primary source of data for computation and is not restricted to semiconductor memory alone and may comprise any kind of physical memory (non-volatile memory included) with a speed fast enough for being accessed by a processing unit efficiently. Newer technologies that offer high speeds of operation which are suitable for transacting with processing units of any kind may also be used to build physical memories in the future. With frequent relocation of pages between a physical memory (also referred to as a primary memory in some embodiments) and a secondary storage (secondary memory) there is delay introduced into a computing system that uses virtual memory. This delay is amplified if large pages, e.g., 64 KBytes to several megabytes in size, are frequently transferred between the physical memory and the secondary storage. This is unacceptable in some applications and systems. There is thus a need for overcoming these and/or other deficiencies, bandwidth limitations, power and performance issues associated with prior art.

SUMMARY OF THE INVENTION

Methods, systems, and computer program products to handle paging involving pagelets are also included. In one embodiment, a virtual memory system associated with a processing unit comprises a memory having at least one page that comprises a plurality of pagelets. The virtual memory system comprises at least one page table having at least one entry with a virtual to physical translation, the at least one entry comprising a physical address that is associated with the at least one page having pagelets. Also included are pagelet state indicators associated with the at least one entry that are respectively associated with corresponding pagelets. The pagelet state indicators comprise pagelet validity indicators that are individually associated with the corresponding pagelets; the pagelet state indicators may further comprise pagelet dirty indicators that are also individually associated with the corresponding pagelets. A pagelet translation lookaside buffer capability is also included to handle translations of pages having pagelets and corresponding pagelet state indicators. In some embodiments, the pagelet state indicators are also referred to as pagelet states. Methods to use the pagelet translation lookaside buffer for various operations involving pagelets are also included.

In one embodiment of a processing unit/system having a virtual memory system comprising a memory having at least one page that comprises a plurality of pagelets, and at least one page table comprising at least one first entry that comprises a virtual address to a physical address translation (or a virtual page number to a physical page number translation) associated with the at least one page, there are pagelet state indicators associated with the at least one first entry associated with that at least one page, wherein the pagelet state indicators are associated with respective pagelets of that at least one page.

In one embodiment of a processing unit/system, the pagelet state indicators comprise pagelet validity indicators that are individually associated with respective pagelets of a page. In some embodiment of a processing unit/system, the pagelet state indicators comprise pagelet dirty indicators that are individually associated with respective pagelets of a page.

In one embodiment of a processing unit/system, a physical page number is stored in an entry associated with the corresponding page, and wherein the physical page number is used to compute a physical pagelet address associated a pagelet of that corresponding page. In one embodiment of a processing unit/system, the pagelets are non-overlapping. In some other embodiment the pagelets may be overlapping in a definite, predictable, and well-defined way.

In one embodiment of a processing unit/system, the pagelets are arranged to be sequentially contiguous. In some other embodiment the pagelets may be arranged to be non-sequential but placed in a definite, predictable, and well-defined way.

In one embodiment of a processing unit/system, the pagelets in at least one page are transferred in a first order or in a second order wherein the first order and the second order are different. In yet another embodiment of a processing unit/system comprising pages having pagelets, the pagelets of different pages are transferred in an interleaved order.

In one embodiment of a processing unit/system, a dirty page (e.g., a dirty page is a page that has been modified) may contain at least one dirty pagelet having modified data, and further, that dirty page may also contain at least one pagelet which is not modified (and not dirty); and wherein the at least one dirty pagelet is transferred, and wherein the at least one pagelet which is not modified (not dirty) is not transferred. It may be noted that it is possible to have a page which is written to but where the data written does not modify the page contents, yet the page may be classified and treated as dirty, unless determined otherwise.

In some embodiment of a processing unit/system, an entry may comprise a Type field to distinguish a next level page table from a page with pagelets. In some embodiment of a processing unit/system, an entry may comprise a lock attribute to lock at least one page with pagelets in the memory.

In some embodiment of a processing unit/system, there may be at least one pagelet containing a location addressed by an agent in a transaction, and wherein the at least one pagelet is identified as critical (e.g., when the transaction contains a physical address or a virtual address that refers to a location associated with that at least one pagelet it may be determined that that at least one pagelet is critical.) In some embodiment of a processing unit/system, a pagelet identified as critical is transferred first in a page transfer prior to transferring pagelets that are not identified as critical.

In some embodiment of a processing unit/system, the memory is a physical memory holding at least one physical pagelet. In some embodiment of a processing unit/system, there may be at least one physical pagelet that is transferred between the physical memory and a secondary storage.

In yet another embodiment of a processing unit/system having a virtual memory system that comprises a pagelet translation lookaside buffer that handles pages having pagelets, where in the pagelet translation lookaside buffer comprises at least one translation entry that comprises a virtual address to a physical address translation associated with at least one page that comprises a plurality of pagelets. Further the at least one translation entry comprises pagelet validity indicators that are individually associated with respective pagelets from the plurality of pagelets.

In some embodiment of a processing unit/system, at least one translation entry may be associated with pagelet dirty indicators that are individually associated with respective pagelets of at least one page associated with that at least one translation entry. In some embodiment of a processing unit, a virtual address to the physical address translation is associated with a physical page in a physical memory.

In one embodiment of a processing unit, the pagelets residing in a corresponding physical page are non-overlapping. In some other embodiments of a processing unit, the pagelets residing in a physical page may be overlapping in a definite, predictable, and well defined way.

In one embodiment of a processing unit, the translation entry comprises a lock attribute, and wherein the lock attribute when asserted, locks the translation entry in the pagelet translation lookaside buffer, and wherein locking the translation entry prevents the translation entry from replacement.

In one embodiment of a processing unit, the pagelet translation lookaside buffer comprises a critical pagelet determiner which indicates a critical pagelet, wherein the critical pagelet contains a location addressed by an agent in a transaction.

In one embodiment of a processing unit, the pagelet translation lookaside buffer further comprises a pagelet state updater which updates a pagelet state of a critical pagelet. In some embodiment of a method to probe a pagelet translation lookaside buffer in a computing system, the method comprises presenting a virtual address to the pagelet translation lookaside buffer that handles pages having pagelets, obtaining a virtual page number, and matching with one or more entries in the pagelet translation lookaside buffer to obtain a matching entry; it further comprises reading one or more access control identifiers and a privilege level; checking pagelet states of the matching entry for a valid pagelet present, and checking for a pagelet hit or a pagelet miss, and upon a pagelet hit, checking the one or more access control identifiers and privilege level against the matching entry and deciding to permit or deny access to the matching entry; and also raising a protection failure when access to the matching entry is denied; or alternately, when access is permitted, returning an entry number associated with the matching entry and the matching entry contents.

In another embodiment, a method to read data from an address location in a system comprises: presenting a virtual address to probe a pagelet translation lookaside buffer that handles pages having pagelets and obtaining a matching entry; obtaining a valid pagelet offset, a location offset and a physical page number from the matching entry; computing a physical page address and using the physical page address to compute a physical location address by adding the valid pagelet offset, the location offset, and the physical page address; checking read permissions associated with the matching entry; raising an exception when failing to receive permission to read, or alternately, when permission to read is received, providing the physical location address to access the location, and thereafter, reading data from the location and returning data, and updating pagelet states in response to accessing the location.

In some embodiment, a method to write data to a location comprises: presenting a virtual address to probe a pagelet translation lookaside buffer that handles pages having pagelets and obtaining a matching entry; obtaining a valid pagelet offset, a location offset and a physical page number from the matching entry; computing a physical address by adding the valid pagelet offset, the location offset and the physical page number; checking write-permissions associated with the matching entry; raising an exception when failing to receive the permission to write, or alternately, when permission to write is received, providing the physical address to access the location; writing data to the location; and updating pagelet states in response to accessing the location.

In one embodiment, a method to evict a dirty page and write back a dirty pagelet to secondary storage comprises: presenting a virtual address of a page to evict and reading one or more page tables to get an associated page table entry comprising a physical page number, pagelet states and page attributes; probing a pagelet translation lookaside buffer that handles pages with pagelets, to find a matching translation entry; upon finding the matching translation entry, updating the pagelet states in the associated page table entry in the one or more page tables and invalidating the matching translation entry in the pagelet translation lookaside buffer; checking pagelet states in the associated page table entry for dirty pagelets; in response to finding the dirty pagelet, computing a physical pagelet address of the dirty pagelet, and a secondary storage pagelet address; setting up a direct memory access transaction to transfer the dirty pagelet to the secondary storage and starting the direct memory access transaction; and returning a message in response to completion of the direct memory access transaction.

In a further embodiment, a method to insert a translation in a pagelet translation lookaside buffer comprises: presenting a virtual page number of a page to insert and reading one or more page tables to get an associated page table entry comprising a physical page number, pagelet states and page attributes; probing the pagelet translation lookaside buffer that handles pages having pagelets to find a matching translation entry; in response to finding the matching translation entry, updating the matching translation entry; when no matching translation entry is found, then finding a replacement candidate entry in the pagelet translation lookaside buffer, and updating pagelet states of a corresponding page table entry in the one or more page tables, the corresponding page table entry associated with the replacement candidate entry; creating a new translation comprising the virtual page number, an associated access control identifier, the physical page number, the pagelet states, and the page attributes; and writing the new translation into the replacement candidate entry in the pagelet translation lookaside buffer.

BRIEF DESCRIPTION OF DRAWINGS

FIGS. 1B1 and 1B2 are presented to illustrate the differences in resource utilization consumed to cause a page transfer from memory to secondary storage of an entire page compared to the transfer of a single dirty pagelet in a page, in accordance with one possible embodiment.

FIG. 2 illustrates an example block diagram of a memory system using a paging scheme with page tables and pages comprising pagelets, in accordance with one possible embodiment.

FIG. 3A illustrates fields of a page table entry for a page table handling pagelets and for a page comprising pagelet states, in accordance with one possible embodiment.

FIG. 3B illustrates one example of fields of a page table entry for a page with pagelet states, and an operation permission field, in accordance with one possible embodiment.

FIG. 4A shows one example of pagelet states, in accordance with one possible embodiment.

FIG. 4B shows a possible pagelet state transition diagram showing Write-Back and No Write-Back eviction of pagelets, in accordance with one possible embodiment.

DETAILED DESCRIPTION OF THE INVENTION

Systems, methods and computer program products are disclosed in which a page in a memory is sectioned into a plurality of pagelets (sub-pages) of sizes smaller than the page to speed up data transfers. The pagelets in the page are used to store, transport and process data, wherein individual pagelets are transferred between a memory and a secondary storage in the system with smaller individual latencies than that of the page they comprise. Further, the pagelets may be transferred in any order such that there is a reduction in the effective latency of the transfer of critical chunks of data as seen by a process and/or application thread and/or a device and/or processing unit using that data. In various systems, methods and computer program products, the pagelets having critical chunks of data in one or more pages are transferred first between the secondary storage and the memory (or sometimes vice versa) which allows a processing unit running a thread of computation to proceed with smaller delays, lower latencies, smaller waiting periods and higher efficiencies, and often, higher performance overall. Using pagelets also allows real-time systems to provide faster control and response in critical real-time applications. Further, only modified pagelets (e.g., dirty pagelets) that comprise modified data need to be written to secondary storage. This is evident when a page is evicted from the memory in a system. Since pagelets are smaller than a page, the latency of eviction and the bandwidth used for transfer are reduced as compared to prior art. In embodiments, pagelets of a page share one entry in a page table that also includes a virtual page number to physical page number translation. Since the location of the pagelets in a page and their respective sizes can be exactly represented, their location addresses, called the pagelet addresses, can be exactly computed from a given physical page number of the page. The physical page number is used to compute the physical page address of the page, and a pagelet offset can be used with the physical page address to compute the physical pagelet address (i.e., pagelet address). Ability to transfer individual pagelets of a page becomes crucial in many memory and page-limited systems which may include databases, search engines, distributed databases, content providing systems, distributed reservation systems managing air transport, railway, freight, travel, etc. Conventional page caching systems may be modified to incorporate pagelet caching (e.g., pagelet based page caching) and pagelet transfer mechanisms, and methods disclosed in the embodiments herein to improve latency, bandwidth and power for added benefit.

The following description of the embodiment(s) is merely exemplary (illustrative) in nature and is in no way intended to limit the invention, its application, or uses. Additionally, the invention may be practiced according to the claims without some or all of the illustrative information.

Figure 1A:
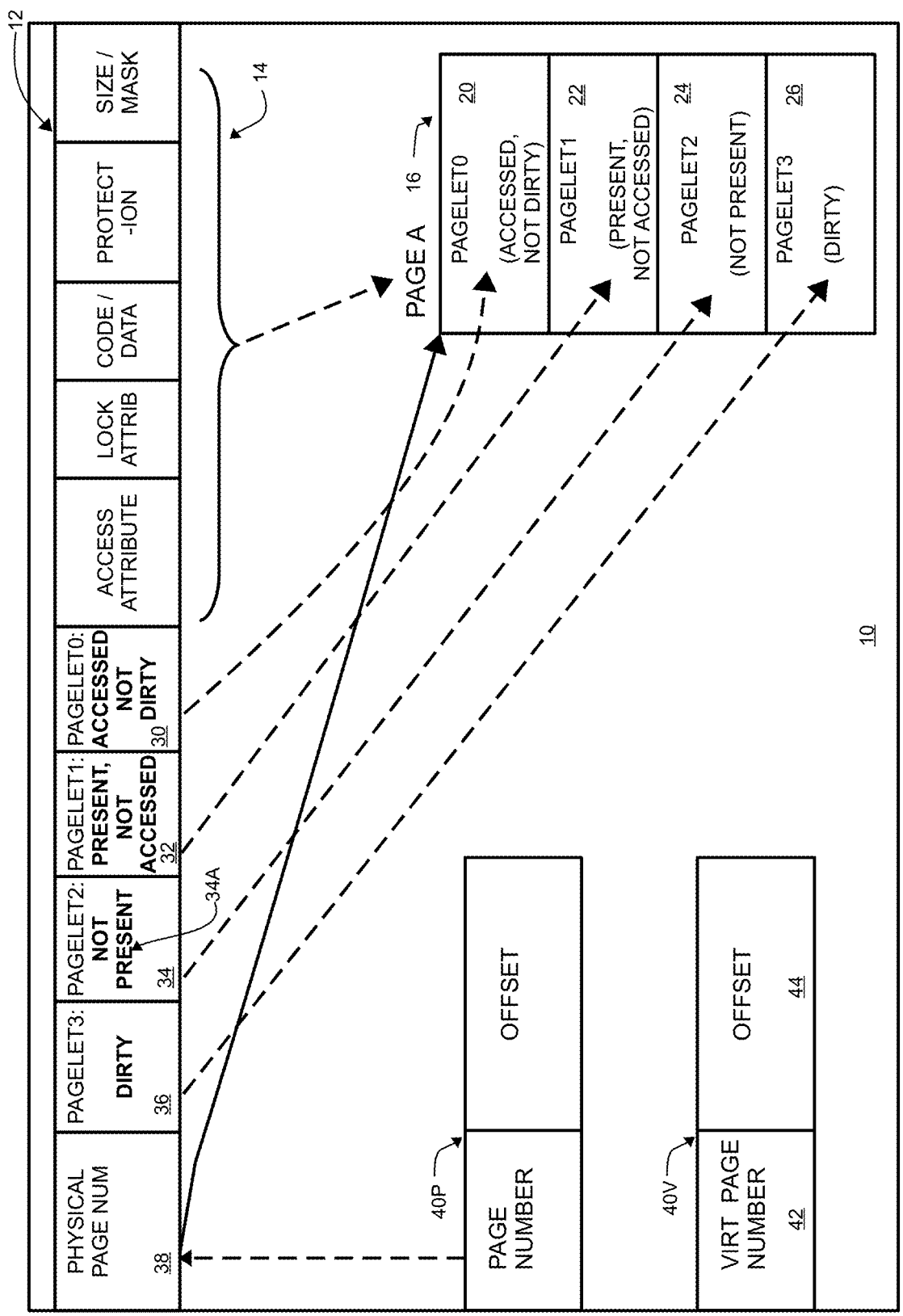
FIG. 1A illustrates an example embodiment of a virtual memory system having pages comprising a plurality of pagelets, in accordance with one possible embodiment.

FIG. 1A illustrates one example embodiment of a virtual memory system having pages comprising a plurality of pagelets. Optionally, the example virtual memory system may be implemented in the context of any of the foregoing figures, or in any other environment.

In FIG. 1A, the virtual memory system comprises memory 10 holding a page table entry 12 and a page frame 16 (containing page A) comprising pagelets: PAGELET0 (pagelet 20), PAGELET1 (pagelet 22), PAGELET2 (pagelet 24) & PAGELET3 (pagelet 26); and the page table entry 12 is associated with page A with a virtual address 40V that comprises a virtual page number 42 and an offset 44. Page table entry 12 comprises pagelet states such as: pagelet state 30, pagelet state 32, pagelet state 34 & pagelet state 36 individually associated with pagelet 20 (PAGELET0), pagelet 22 (PAGELET1), pagelet 24 (PAGELET2) & pagelet 26 (PAGELET3), respectively. Page table entry also has a physical page number 38 to refer to the page frame 16 of page A in the memory and page A has a physical address 40P. Page table entry 12 (also known as page translation 12 or alternatively known as a virtual address to physical address translation 12, any of which terms are used interchangeably) also holds page attributes 14 for page A which comprise the size or mask, protection for access control, page type (Type), memory access attributes, and translation lock attribute associated with page A. The page attributes 14 are not limited to what is illustrated in the embodiment of FIG. 1A and may comprise other fields not included here. Pagelet states 30, 32, 34 & 36 individually characterize the states of their respective pagelets PAGELET0 (20), PAGELET1 (22), PAGELET2 (24) & PAGELET3 (26) to individually control address translation, reading, writing, eviction, and transfer of the pagelets 20, 22, 24 & 26 (as a part of the transfer of page A). In some embodiments, a pagelet state can also be referenced as pagelet presence indicator or a pagelet validity indicator, or a pagelet state indicator, or in some embodiments, as a pair of: referenced bit and modified bit.

For instance, in this embodiment, in one page transfer scenario, at a point in operation, PAGELET1 (22) of page A is present in page frame 16 but has not been accessed and its pagelet state 32 is marked PRESENT, NOT ACCESSED; at the same time PAGELET0 (20) has been accessed for reading but not made dirty, and hence its pagelet state 30 is marked ACCESSED NOT DIRTY. PAGELET2 (24) has not been fully brought into the page frame 16 at that time and is considered NOT PRESENT and hence not ready to be accessed; pagelet state 34 of PAGELET2 (24) is therefore marked NOT PRESENT. Now consider PAGELET3 (26) which has been accessed and written to (and hence considered modified) and is therefore considered DIRTY with its pagelet state 36 marked DIRTY. Pagelet states 30, 32, 34 & 36 are updated to reflect changes in the status of pagelets 20, 22, 24 & 26 respectively, as transactions and accesses are performed. Since pagelets are smaller than a page, the latency of eviction and the bandwidth used for transfer of a pagelet is reduced when compared to a legacy page (conventional page in prior art) transfer. The pagelet states are stored in page tables held in physical memory as part of translation entries. The pagelet states may be accessed using load and store instructions or translation related instructions. They may also be accessed using a hardware pagelet walker that can update pagelet translation lookaside buffers and/or page tables FIG. 1B1 and FIG. 1B2 illustrate examples of a page transfer from memory to secondary storage involving a dirty portion or a dirty pagelet in a dirty page, in accordance with one possible embodiment. It illustrates an example of how individual pagelet state indicators improve efficiency of page transfers.

Pagelets in a physical page are transferred between a physical memory and a secondary storage as the physical page is brought into or evicted out of the physical memory, as the case may be. In some embodiments, the transfer of pagelets and pages may happen between two memory systems where both are physical memories (for e.g. DRAMs) where one is like a primary memory and the other is remote and is like a secondary memory; or in some embodiments, the pagelet (and page) transfer may occur between two storage systems where both are slower secondary storages. Some transfers may happen across multiple nodes in a network where a pagelet transfer may occur between the nodes in a distributed system where one node is local and the other is remote. Such a pagelet transfer may be part of a page transfer or may simply be to sync up pagelets across memories in the distributed system, and it may be accompanied by the transfer of pagelet states, attributes, and translations along with the pagelets. For e.g., a primary physical memory may be on one node of a distributed system and the secondary memory and/or secondary storage may be on a different node; the two nodes may not even be in geographical proximity and may instead be in different places—one local and the other remote and connected by an internetwork. In such embodiments, minimizing transfer latencies and bandwidth is of utmost importance where conventional methods underperform the pagelet transfer and pagelet state update mechanisms disclosed in here.

In the example of FIGS. 1B1 & FIG. 1B2 a comparison of resource utilization between transfer of an entire page from memory to secondary storage versus transfer of a single dirty pagelet of a page is illustrated. In some example embodiment of FIGS. 1B1 & FIG. 1B2, a legacy page 50 (or a page 70 having pagelets) is to be synched between a memory 60 and a secondary storage 62. FIGS. 1B1 & FIG. 1B2 are being presented in the same sheet in order to contrast the resource utilization between two scenarios-1) a legacy page transfer technique, versus 2) an implementation of herein disclosed techniques of transferring pages having only some dirty pagelets.

In the example of FIG. 1B1, in one scenario, legacy page 50 in unmodified form resides in secondary storage; a copy of the legacy page 50 residing in memory 60, has been modified in a page portion 58, which causes the legacy page 50 in its entirety to be marked DIRTY. The legacy page 50 in its entirety is considered DIRTY and upon eviction is transferred from memory 60 to secondary storage 62 in its entirety even when page portion 52, page portion 54 & page portion 56 are not modified, and when only the page portion 58 was modified. In implementation of the legacy technique the legacy page 50 in its entirety would be considered DIRTY and transferred, thus consuming resources (e.g., bandwidth, bus, buffer space, etc.) as would be needed for the entire page to be transferred. This is shown in the pie chart (in FIG. 1B1) wherein the resources consumed (shown as USED) are close to 100%.

In FIG. 1B2 the page 70 having pagelets PAGELET0, PAGELET1, PAGELET2 & PAGELET3. In the scenario where page 70 having pagelets in unmodified form resides in secondary storage, and a copy of page 70 with pagelets has been modified in PAGELET3 alone, only PAGELET3 is marked DIRTY. In this example the pagelets' states (not explicitly shown) are as follows: PAGELET0 is NOT DIRTY; PAGELET1 is NOT ACCESSED; PAGELET2 is NOT PRESENT; and PAGELET3 is DIRTY. When a synch up of page 70 having pagelets is carried out, the data contained in frame 72 of PAGELET0, frame 74 of PAGELET1 and frame 76 of PAGELET2 are NOT transferred because these pagelets have not been modified and thus their copy in memory 60 is identical to their copy in secondary storage 62. Only PAGELET3 in frame 78 contains data that has been modified and thus its pagelet state and/or pagelet dirty indicator is marked DIRTY. Therefore, only PAGELET3 in frame 78 needs to be transferred between the memory 60 and the secondary storage 62. Such a transfer of only dirty pagelets (in contrast with complete pages) reduces the cost of transfer of dirty pages that are modified only in a particular small region in them. In this example of FIG. 1B1 and FIG. 1B2, the page with a single dirty PAGELET3 has only a quarter of the resource utilization (as shown USED in the associated pie chart of FIG. 1B2) compared to the case where the entire legacy page is transferred.

A machine architecture comprises an embodiment of a set of one or more machine instructions of an instruction set architecture implemented in a context of a processing unit; in the context of this description the terms instruction and machine instruction are used interchangeably; an embodiment of a computer program comprises one or more sequences of machine instructions which sequences hereinafter are referred to as instruction sequences.

Figure 1C:
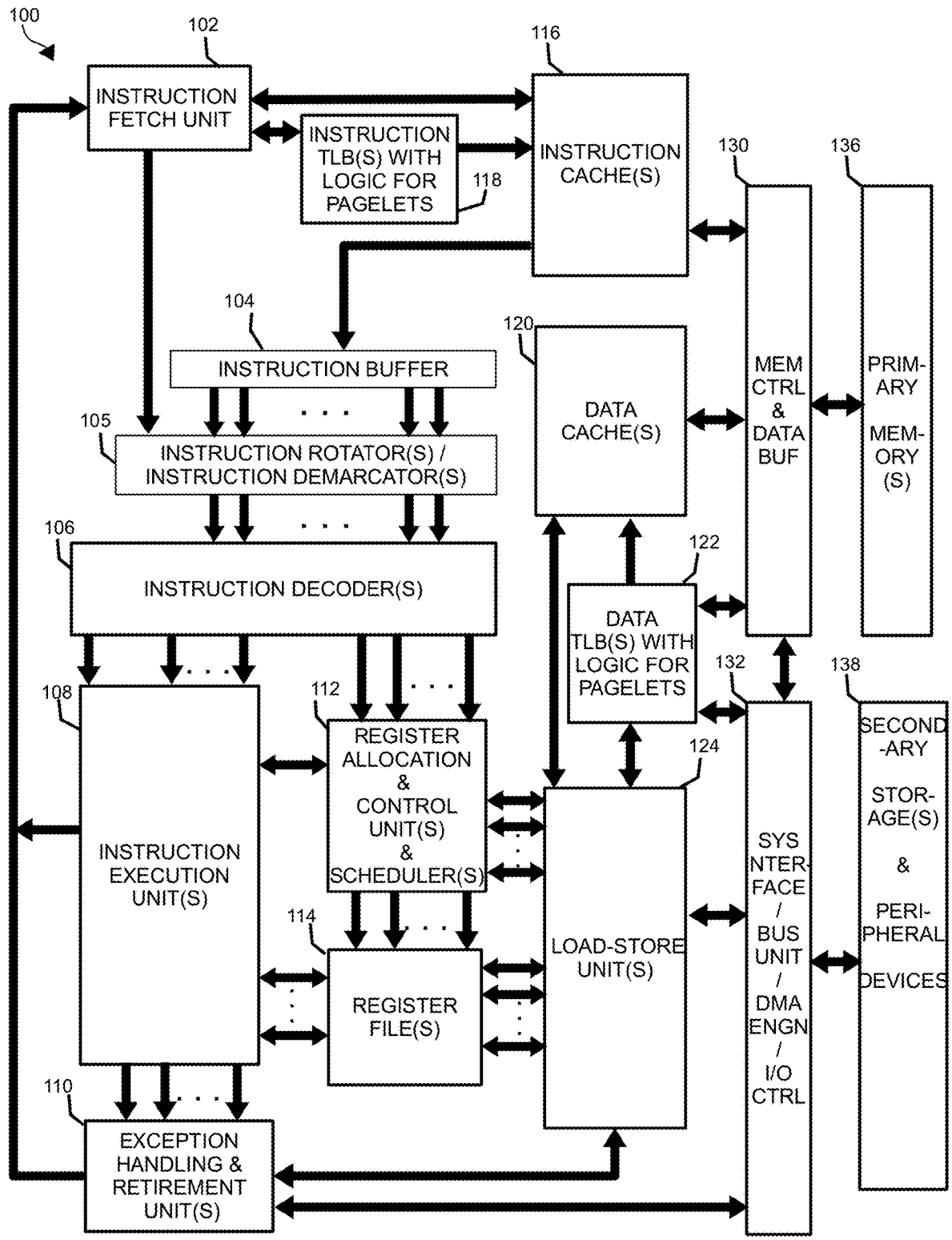
FIG. 1C illustrates a system that uses virtual memory and comprises one or more pagelet translation lookaside buffers with logic for handling pages with pagelets, in accordance with one possible embodiment.
Figure 2:
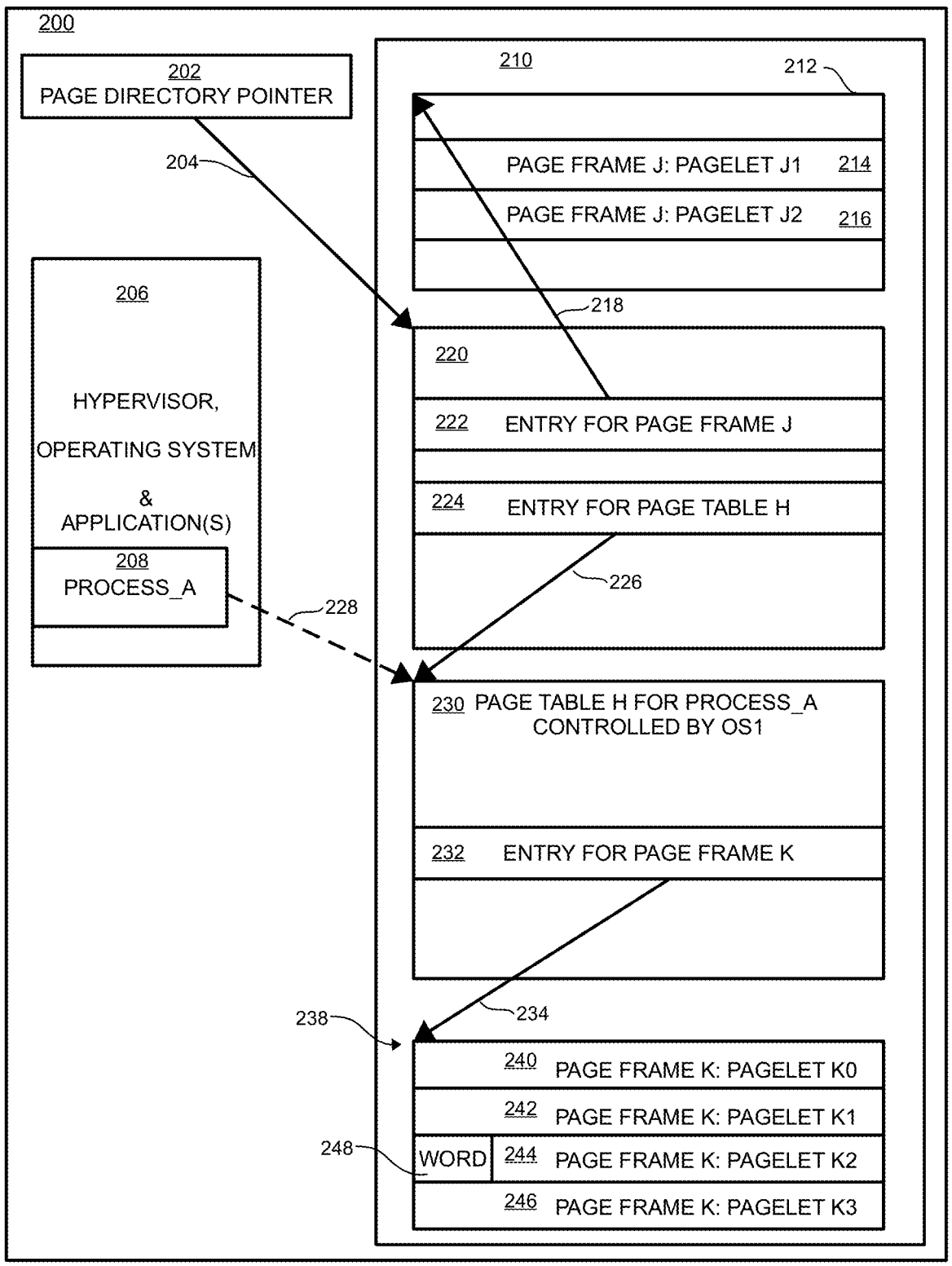

FIG. 1C illustrates a system 100 that uses virtual memory and comprises one or more pagelet translation lookaside buffers (PTLB) with logic for handling pages with pagelets, in accordance with one possible embodiment. Optionally, the system 100 comprising a processing unit may be implemented in the context of any of the foregoing figures.

The system 100 may be used for computation, control, graphics, communication and/or any form of data processing including machine learning in some embodiment. The system 100 (referred to as a central processor in some embodiments) can be used in a system (such as FIG. 16) comprising a system memory, a storage, and other components, in accordance with some embodiments for one or more applications.

In the embodiment shown in FIG. 1C, the processing unit of system 100 comprises one or more instruction fetch unit(s) such as instruction fetch unit 102 coupled optionally to one or more optional instruction cache unit(s) such as instruction cache 116. Instruction fetch unit 102 may optionally comprise or work in conjunction with a branch prediction logic in some preferred embodiments. In some embodiments, one or more pagelet translation lookaside buffers handling instruction pages with pagelets (Instruction PTLB) like instruction PTLB 118 receive at least one virtual address from the instruction fetch unit 102 during a fetch transaction and translate the received virtual address into a physical address and present it to the instruction cache unit (ICU) such as instruction cache 116 and/or a memory controller 130. One or more Instructions or portions of instructions are fetched in a fetch transaction under the control of instruction fetch unit 102 from the instruction cache 116 or the memory controller 130 that transfers the one or more instructions or portions of instructions into one or more instruction buffer(s) such as an instruction buffer 104. In some embodiments, the processing unit of system 100 also comprises one or more instruction demarcator(s)/instruction rotator(s) such as instruction demarcator/instruction rotator 105 that receive the one or more instructions or portions of instructions from instruction buffer 104. The instruction demarcator/instruction rotator 105 determines the instruction boundaries and transfers individual instructions to one or more instruction decoder(s) such as instruction decoder 106 for decoding.

Instruction fetch unit 102 may control and/or cause instruction sequences to be fetched from memory 136 and/or instruction cache unit(s) such as instruction cache 116 or from some data buffer in memory controller 130 into the instruction buffer 104. In some embodiments, when there is an instruction cache miss and/or a higher-level cache miss the instructions are fetched from the memory 136 (for example, main memory or system memory or a graphics memory, or a memory mapped input output (MMIO) device, etc., in some embodiments) under the control of the memory controller 130. In some embodiments, when an uncacheable/uncached transaction occurs the instructions are fetched from memory; the instruction PTLB 118 may be involved in address translation/page translation. A page fault occurs when a valid page at the translated address is not found in the memory and/or caches. In the event of a page-fault, at least one pagelet of instructions is transferred from the secondary storage 138 via a system interface/bus unit 132, to the memory controller 130 and placed into memory 136 at the physical address of the pagelet in an allocated physical page frame. The system interface/bus unit further comprises a direct memory access (DMA) engine, an input/output (I/O) controller, etc.

Processing unit of system 100 may also comprise one or more instruction execution unit(s) such as EXE 108 which comprise arithmetic logic units to perform various arithmetic, logical and other kinds of computations (including but not limited to multiplication, division, transcendental and other scalar and vector computations, searching, sorting, swizzling, etc.). The instruction execution unit(s), like EXE 108, may also perform branch target determination and branch related computations or may work in conjunction with a branch unit (not shown) that performs such and related functions. Processing unit of system 100 may also comprise one or more register allocation and control unit(s)—RAC 112, and one or more register files such as REG 114. Register files like REG 114 may include general purpose registers, control registers such as those to hold translation modes and properties, page directory pointer(s), operating system identifier(s), process and thread identifier(s), etc. Optionally, in some embodiments, RAC 112 may comprise or work in conjunction with a scheduler (SCHED) inside the RAC 112, and/or a re-order buffer (ROB) (not shown), and/or other control logic such as a scoreboard logic (not shown) for instruction and operand scheduling. Some embodiments may include one or more instruction schedulers to schedule and control instruction execution in the processing unit. The control logic in RAC 112 may directly or indirectly control various aspects and components of system 100.

The processing unit of system 100 further comprises one or more load and store unit(s) such as load and store unit 124 which may be coupled to instruction execution unit(s) such as EXE 108, the register file(s) such as the REG 114, and the RAC 112. The load and store unit 124 may be coupled to a pagelet translation lookaside buffer that handles data pages with pagelets (Data PTLB) such as data PTLB 122 which translates virtual addresses to corresponding physical addresses (and sometimes vice versa). Transactions involving such translations may include load, store and/or other related transactions (including stack, atomic, MMIO, etc. and not limited to these transactions alone). The data pagelet translation lookaside buffer such as data PTLB 122, as the name suggests, handles translation of page addresses/page numbers of pages (for e.g., page frames) comprising pagelets, and has entries that comprise pagelet states which include pagelet validity indicators and pagelet dirty indicators. In some embodiments, processing unit of system 100 may further comprise one or more data cache unit(s) such as data cache 120 coupled to the data pagelet translation lookaside buffer(s) like data PTLB 122, and also coupled to the system interface/bus unit 132 and the memory controller 130. The processing unit of system 100 also comprises an exception handling unit 110 to handle exceptions including system exceptions and including those related to page faults. The exception handling unit 110 also handles exceptions such as, for example, a TLB miss and/or a protection failure associated with or generated by the instruction PTLB 118, and/or data PTLB 122, and/or interrupts (including those from secondary storage 138) among other things.

In the context of the present description, a bus unit may further comprise logic to control and access one or more internal and external interfaces, modules and/or components. For example, in various embodiments, system interface/bus unit 132 may include, but is not limited to one or more non-volatile memory (NVM) controllers (not shown), one or more storage controllers (not shown), one or more input/output (I/O) controllers (IOC), one or more interrupt controllers (besides those included in exception handling unit 110), one or more co-processors (not shown), one or more graphics interfaces (not shown) and display control units (not shown), one or more security processor units (not shown), one or more power controllers (not shown), one or more machine control and system configuration units (not shown), one or more test controllers (not shown), one or more power delivery controllers, one or more internal and/or external transport interfaces (not shown), and any other that meet the above definition. It is conceivable that in some embodiments, the NVM controllers, I/O controllers, security processors, trusted program modules, graphics processors, and various other co-processors and accelerators may locally or remotely use a system instruction or data PTLB handling pages with pagelets to process a translation and check protection associated with a page or a pagelet to access or transfer data. In some embodiments, the instruction cache unit(s) such as instruction cache 116 and data cache unit(s) such as data cache 120 are also coupled to the system interface/bus unit 132 and other higher-level caches that are either local or remote. Use of instruction PTLB 118 and/or data PTLB 122 and use of pagelets may speed up transfers between such local and remote units, memories or nodes.

Pagelets in a physical page are transferred between a physical memory and a secondary storage as the physical page is brought into or evicted out of the physical memory, as the case may be. In some embodiments, the transfer of pagelets and pages may happen between two memory systems where both are physical memories (for e.g., one local primary memory and the other a secondary memory (such as graphics memory, accelerator memory, coprocessor memory, remote memory, etc.)), or between two slower speed storage systems (for e.g., NVM storage & hard drive). Some transfers may happen across multiple nodes in a network where a pagelet transfer may occur between the nodes in a distributed system. Such a pagelet transfer may be part of a page transfer or may simply be to sync up pagelets across memories in the distributed system, and it may be accompanied by the transfer of pagelet states, attributes, and translations along with the pagelets. For e.g., a primary physical memory may be on one node of a distributed system and the secondary storage may be on a different node; the two nodes may not even be in geographical proximity and may instead be in different places connected by an internetwork. In such embodiments, minimizing transfer latencies and bandwidth is of utmost importance where conventional methods underperform the pagelet transfer mechanisms disclosed in here. Conventional page caching systems may be modified to incorporate pagelet caching and pagelet transfer mechanisms, and methods disclosed in the embodiments herein to improve latency, bandwidth and power for added benefit.

In some embodiments, one or more instances of the pagelet translation lookaside buffer(s) with logic for handling instruction pages having pagelets (such as instruction PTLB 118) and pagelet translation lookaside buffer(s) with logic for handling data pages having pagelets (such as data PTLB 122) may be used inside some of the units associated with the system interface/bus unit or other modules such as a co-processor, a machine controller, a security processor, a power/test controller, an NVM controller, a packet processor, a flow controller, or in different nodes of a distributed system, etc.

In the embodiment of FIG. 1C, the processing unit of system 100 having a virtual memory system comprises a memory having at least one page that comprises a plurality of pagelets; at least one page table comprising at least one first entry that comprises a virtual address to a physical address translation associated with the at least one page; and pagelet state indicators associated with the at least one first entry, wherein the pagelet state indicators are associated with respective pagelets. The pagelet state indicators 30, 32, 34, 36 comprise pagelet validity indicators (such as pagelet validity indicator 34A) that are individually associated with the corresponding pagelets. The pagelet state indicator further comprises pagelet dirty indicators 36 that is individually associated with the corresponding pagelet. In the processing unit of system 100, a physical page number is stored in the at least one first entry; the physical page number is used to compute the physical addresses to access any pagelets in that page. For e.g., in one embodiment, a physical page number (in hex) 0x1000 may be used as a base address to access a particular pagelet K which would then be located at address: [0x1000+K*(pagelet_length)], where pagelet_length gives the pagelet length (or in other words, the size or length of a pagelet), and where the pagelet_length*(number of pagelets in the page) is equal to the size of page (i.e., the page size or length of a page) in the one embodiment. In some embodiments, a single physical page number may be used to compute the physical pagelet addresses to access the respective pagelets.

Further, in the context of the present description, in some embodiments, a pagelet translation lookaside buffer with logic for handling pages having pagelets may refer to any instruction and/or data address translation unit that has the logic for handling pagelets, and which may reside in any portion of a system on a chip/semiconductor device. For example, in various embodiments, a graphics processor, a math accelerator, a neural accelerator or co-processor or a networking chip or a field programmable gate array (FPGA), and/or any other sub-system or system or unit that meets the above definition may include a pagelet translation lookaside buffer with logic for handling pagelets and/or a virtual memory system that manages pagelets and is not limited to a system as shown in FIG. 1C. Further, either of instruction PTLB 118 or data PTLB 122 may be implemented with or without the other included in a system, and without some of the other components included in the system. The system may include multiple nodes and may be spread over a considerable geographical area such as multiple buildings housing a data center or even over different geographies.

The following description of the embodiment(s) is merely exemplary (illustrative) in nature and is in no way intended to limit the invention, its application, or uses. Additionally, the invention may be practiced according to the claims without some or all of the illustrative information.

FIG. 2 illustrates an example of a block diagram of a memory system 200 using a paging scheme with page tables and pages comprising pagelets, in accordance with one possible embodiment. Optionally, the memory system 200 using pagelets in pages may be implemented in the context of any of the foregoing figures, or in any other environment.

In one embodiment as in FIG. 2 of memory system 200, a memory subsystem 210 holds a master page table 220 pointed to and accessed using a pointer 204 held in a Page Directory Pointer 202. In some embodiments, the page directory pointer 202 may be a register. A virtual memory system which is one of the views of the memory system 200 also encompasses one or more of a hypervisor and/or a virtual machine monitor, an operating system, a basic input-output system (BIOS), a monitor, and/or one or more application(s), processes and/or threads (lumped in a program block 206) that access the memory subsystem 210. The program block 206 may also have a process 208 (PROCESS_A) that accesses and/or is associated with a page table H 230, operating under the control of an operating system OS1, that resides in memory subsystem 210.

The master page table 220 contains an entry 224 for the page table H 230, wherein the entry 224 contains a pointer 226 which points to page table H 230. In this embodiment, the page table H 230 is associated with process 208 as indicated by an association 228 and pages and pagelets with entries in page table H 230 may be associated with process 208. The page table H 230 comprises entry 232 for a page K residing at page frame K 238. Page K may be accessed by process 208 using a pointer 234 obtained from translation using the entry 232. Page K comprises pagelets: PAGELET K0, PAGELET K1, PAGELET K2 & PAGELET K3 located at pagelet frame 240, pagelet frame 242, pagelet frame 244 & pagelet frame 246, respectively, and at well-defined offsets from the location/origin of the page frame K 238. A word 248 may be accessed by accessing it in PAGELET K2 at pagelet frame 244; and thereafter the pagelet state indicators may be updated for PAGELET K2. The master page table 220 may also contain entries such as 222 for pages such as page J at page frame 212 and accessible via pointer 218 residing in page table entry 222. Page J located at page frame 212 also comprises pagelets J1 at pagelet frame 214 and J2 at pagelet frame 216 among others. Page J may belong to a hypervisor process or an operating system process. It may be a large page with pagelets, or it may be a typical 64 KByte, 32 KByte, 16 KByte or 4 KByte page with pagelets. Large pages can be as large as a few gigabytes in some systems and can have several pagelets. It is also conceivable in some embodiments, for a virtual memory system to have pages with pagelets and pages without pagelets, and pages and/or pagelets of varying sizes. That information can be placed in the page table entry as a pagelet enabling bit/field or it can be placed as a mode in a register. The master page table 220 may be called by various names including but not limited to ones such as L0 page table, page directory or a level-0 page table, or $1^{st}$ level page table, and so on; and while the page table H 230 may be called a level-1 page table or L1 page table or a $2^{nd}$ level page table in those contexts.

FIG. 3A illustrates fields of a page table entry 300 for a page table handling pagelets, and also a page table entry 320 for a page comprising pagelet states, in accordance with one possible embodiment. Optionally, the page table entry 300 and the page table entry 320 may be implemented in the context of any of the foregoing figures, or in any other environment.

In some embodiment shown in FIG. 3A the page table entry 300 may be associated with a next level page table (such as page table H 230); page table entry 300 comprises a field called size/mask 302, a protection field 304, a Type field 306, a physical page number 312 which is used to locate the page frame for the page table in a physical memory such as memory 136, and optionally, a lock attribute 308.

FIG. 3A also shows one embodiment of a page table entry 320 associated with a page such as, for example, page J in page frame 212 in some embodiment. Page table entry 300 for a page table and page table entry 320 for a page may reside in a page table such as master page table 220. Alternately, it is also possible for page table entry 320 to reside in a process or operating system (OS) specific page table at another level. In page table entry 300 (which may share some fields with page table entry 320) a size/mask 302 may be used to determine the offset of a location holding a byte, or word, or any data in a pagelet/page, or a line of data in a page, pagelet, or table. It may also be used to determine the page/frame number or the size of the page. In some embodiments, it may be used to determine the fields and sizes of fields in the page table entry 300. The size/mask 302 may have alternative interpretations such as a size of the associated page or as a mask to determine a page address or a pagelet address. The size, mask may be used to accomplish similar functions. In some aspects they may mean identical things, in some other aspects they may not be identical but may realize similar functionality.

The protection field 304 may implement an access restriction and/or a security restriction on the page table or the pages or pagelets associated with the page table entry 300 and/or page table entry 320. Such access and/or security restrictions may be used to restrict the mode, level and type of access by a thread or a process or an agent or a customer/login or an operating system or an application to the data in one or more pagelets or page associated with the page table entry 300.

The lock attribute 308 may be used to lock a table, or a page associated with page table entry 300 or page table entry 320 in the memory; lock and locking in this context mean to fix a page table or a page in the memory so that it is not removed or swapped out of the memory and transferred to secondary storage. A lock such as lock attribute 308 can also be used to fix/lock a translation in a pagelet translation lookaside buffer (PTLB) of any kind and/or at any level so that it is always readily available when needed.

The Type field 306 in page table entry 300 indicates that the page table entry 300 is associated with a next level page table (TYPE=TBL), where TBL indicates a page table; alternately the Type 326 in page table entry 320 indicates that the page table entry 320 is associated with a page (TYPE=PAGE). The Type 306/Type 326 indicate the type of an entry and may be used to determine the interpretation of the other fields in the entries such as page table entry 300 and/or page table entry 320. For instance, in some embodiment if Type is a 1-bit field then the Type=0 could mean a page table (TBL) and Type=1 could mean PAGE (or vice versa). The page table entry 320 related to a page also includes an access attribute 328 which may be used to determine the access-type of a page (for example, uncacheable, write-buffered or write-coalescing or write-combining, write-through, or writeback, or in some cases write-protected).

Further, the page table entry 320 comprises pagelet state indicators 360A comprising pagelet state 330, pagelet state 332, pagelet state 334 & pagelet state 336 that indicate the validity, presence, access, and/or dirtiness (modified state) of pagelets such as pagelets PGLET0 (with pagelet state 330), PGLET1 (with pagelet state 332), PGLET2 (with pagelet state 334) & PGLET3 (with pagelet state 336), respectively. A physical page number 338 (also called physical frame number) is used to compute the physical page address that gives the location of the physical page frame (physical frame or page frame or physical page in various embodiments) in physical memory, of the page associated with (e.g., pointed to by) page table entry 320. It may be noted that it may be possible for any of the fields in page table entry 300 or page table entry 320 to be omitted or replaced suitably in some embodiment, if warranted, without effecting the use of any of the other fields. This may possibly be done by fixing some attributes and perhaps reducing flexibility provided to a user. Field 310 in page table entry 300 for a page table may be used for any number of purposes in an embodiment. It may comprise pagelet states, although such a scheme involving a table divided into pagelets may have some limited value for page tables since page tables generally reside in memory once a process comes into existence, and such a scheme cannot be precluded in the future. In some aspects, field 310 may be used to hold one or more access control identifier(s) such as an operating system identifier (OSID), address space identifier (ASID) and/or a process identifier (PID) and/or a login that may be associated with a page table. In some cases, it may be reserved for a future enhancement.

FIG. 3B illustrates fields of a page table entry 340 for a page with pagelet states, and an operation permission field 346, in accordance with one possible embodiment. Optionally, the page table entry 340 may be implemented in the context of any of the foregoing figures, or in any other environment. In page table entry 340, the operation permission field 346 may be used to mark a page as a read-only page or alternately, allow reading and writing of the page. In some embodiments, it may be used to mark a page as a text page and/or a code page for program code; and alternately as a data page that can be modified. In some cases, operation permission field 346 may be used to mark shared data pages. Such pages may also comprise pagelets and the page table entry 340 comprises pagelet states. In some embodiments, some pages and some page tables may not comprise pagelets and may have entries where the page state resides in one or more pagelet state fields such as in a page/pagelet state 350.

It is also possible in some embodiments, that a page table entry may comprise separate access attributes (such as access attribute 328), or separate protection fields (such as protection field 304), individually for corresponding pagelets of the page, respectively. Replicating operation permission field 346 or access attribute 328 or protection field 304 or lock attribute 308 may allow them to be customized for each pagelet in a page, provided there are sufficient bits available in an entry.

FIG. 4A shows a table 400 of pagelet state indicators (examples of pagelet states), in accordance with one possible embodiment. Optionally, the pagelet state indicators in table 400 may be implemented in the context of any of the foregoing figures, or in any other environment. Pagelet state indicators may comprise pagelet validity indicators and pagelet dirty indicators. Pagelets individually may have separate pagelet states maintained. In table 400, a pagelet state Page Not Present (PNP) indicates that an associated pagelet is not present in memory, and/or is an invalid pagelet, and/or is a pagelet that is partially present in memory, and/or that the pagelet is not available for a transaction at a point during an operation. In some embodiments, state PNP may indicate a page in transit. In some embodiments, a Pagelet Pending state may be used to indicate pages in transit. In some embodiments, Pagelet Invalid or Pagelet Absent may be used to indicate that a pagelet is not present in the memory (partially or wholly).

In one embodiment, in table 400 a pagelet state Pagelet Present Not Accessed (PPNA) indicates that the associated pagelet is present in the memory and is available for use but has not been accessed for reading or writing. The act of reading may include snooping, probing or any other activity that does not change the data in the page. In some embodiments, the act of accessing a page may be broader or narrower. In yet other embodiments, a Page Present state may be used for a page that is present in memory whether it has been accessed or not, and/or whether it has been modified or not, provided it is in the memory.

In table 400 a pagelet state Pagelet Accessed Not Dirty (PAND) associated with a pagelet indicates that a pagelet has been accessed but not modified; and a pagelet state Pagelet Dirty (PD) indicates that a pagelet has been modified and is DIRTY and contains modified data, e.g., the pagelet data has been modified (typically) via a write transaction. In some embodiments, some pagelets such as those that are write-protected or those which cannot be normally modified such as code and/or text pages, may discard some states associated with dirtiness (such as DIRTY or PD). They may still use a page state such as PAND. The pagelet validity indicator may indicate pagelet states PNP and PPNA and may comprise one or more bits of state. The pagelet validity indicator may optionally comprise the pagelet state PAND indication also. In other embodiments, pagelet dirty indicator may indicate a state pagelet dirty (PD). Typically, pagelet validity indicator and pagelet dirty indicator may together be implemented as a pagelet state indicator. In some embodiments, the pagelet state indicators may simply indicate validity (presence) and invalidity (absence) using just two states—Present and Absent; or alternately the pagelet validity indicator may have states—Valid and Invalid. While in conventional systems and methods, the individual page state is updated, in the instant embodiment the pagelet states are individually determined and updated as per table 400 and using a pagelet state transition scheme such as one illustrated using an example in FIG. 4B. This allows for partially valid pages or partially present pages to be used in further computations thereby improving performance. The pagelet state indicators in table 400 and their alternate forms are usable both in a page table entry and in a pagelet translation lookaside buffer entry.

FIG. 4B shows an example of a pagelet state transition diagram 420. The pagelet state transition diagram 420 shows pagelet state transitions including Write-Back and No Write-Back eviction of pagelets, in accordance with one possible embodiment. Optionally, the pagelet state transition diagram 420 may be implemented in the context of any of the foregoing figures, or in any other environment.

The pagelet state transition diagram 420 comprises four states, namely Page Not Present (PNP) 422, Page Present Not Accessed (PPNA) 424, Page Accessed and Not Dirty (PAND) 426 and Page Dirty (PD) 428 which are described in table 400 of FIG. 4A. After a RESET event or at the time of creation of a translation before a pagelet is present or whenever a translation is no longer valid the state is set to PNP 422 to indicate pagelet not present (also indicates pagelet not available).

When a fetch transaction 432 occurs and a valid pagelet is brought into memory, its state transitions to PPNA 424 indicating pagelet present in memory but not accessed yet. If the pagelet is read but not written to or modified in any way via a possible read transaction 436 the pagelet state is marked PAND 426 to indicate pagelet accessed but not modified. When the pagelet in either PPNA 424 or PAND 426 states is written to or modified via a write transaction 440A or a write transaction 440B, respectively, the pagelet state is changed to PD 428 indicating a dirty pagelet. Any read transaction 442 of a pagelet in state PAND 426 where the pagelet is not modified, causes the state PAND 426 to be retained. Similarly, as long as the pagelet in state PPNA 424 is not accessed its state does not change. Once a pagelet is dirty it stays in state PD 428 on any transaction except an eviction or invalidation. When an eviction of pagelet in state PPNA 424 or in state PAND 426 occurs via an evict transaction 434A or an evict transaction 434B, respectively, the pagelet state transitions to PNP 422 in both cases. When an eviction of a dirty pagelet in state PD 428 occurs it may also trigger a writeback of the pagelet which is indicated by evict & writeback transaction 438, and that changes the pagelet state to PNP 422. The writeback typically would be to secondary storage, or it may be to a buffer that may eventually be saved to secondary storage. It is important to note that in a page with multiple pagelets, different pagelets may be in different states and the respective pagelet states will transition based on which pagelets are affected by a transaction, and the pagelets may be affected similarly or differently by the transaction occurring on the page.

Figure 5:
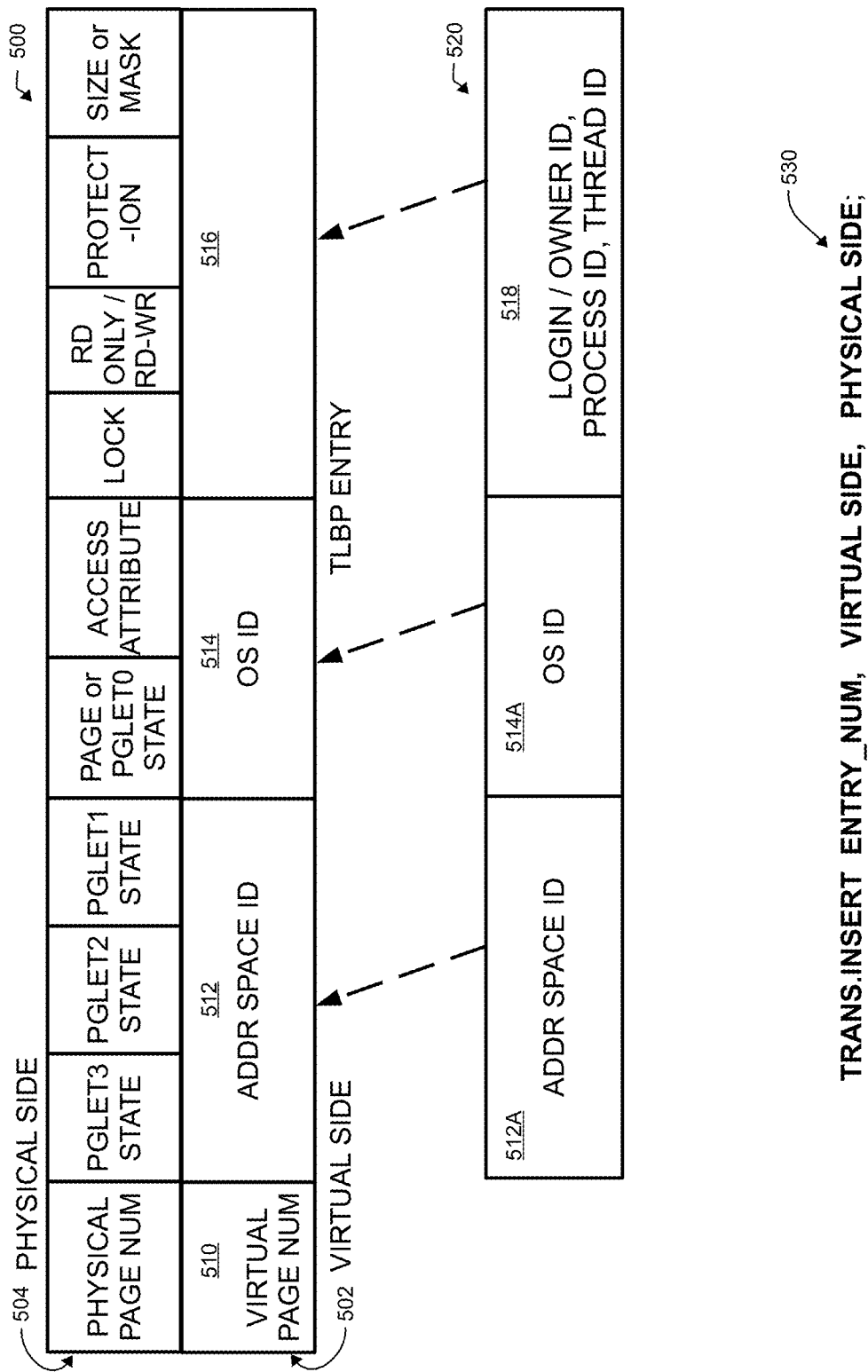
FIG. 5 illustrates an example of a pagelet translation lookaside entry for handling pages with pagelets, and an example translation insertion instruction, in accordance with one possible embodiment.

FIG. 5 illustrates an example of a pagelet translation lookaside entry 500, one or more register(s) 520 holding operating system, address space or process and other identifier information, and an example of a translation insertion instruction 530, in accordance with one possible embodiment. Optionally, the pagelet translation lookaside entry 500 or the register(s) 520 or the translation insertion instruction 530 may be implemented in the context of any of the foregoing figures, or in any other environment.

In FIG. 5, the pagelet translation lookaside entry 500 (also referred to as a translation entry, in short) comprises two parts—a virtual side 502 and a physical side 504. The virtual side 502 comprises fields such as a virtual page number 510 which identifies a page in memory. This page may comprise pagelets or may not comprise pagelets. The virtual side 502 may optionally comprise access control identifier(s) such as an address space identifier (ASID) 512) to be used in some cases, for e.g., with a multi-address space operating system.

The virtual side 502 may optionally further comprise one or more access control identifier(s) such as an operating system identifier (OSID) 514) and/or other optional identifier(s) 516 such as a login or owner's identification, a process identifier (PID) or a thread identifier or a process group identifier, for instance. These identifiers or sometimes public keys may be used to control access to the page or pagelets, and their translation. The virtual side 502 may receive the access control identifier(s) such as ASID 512, OSID 514, and the other optional identifiers(s) 516 from either register(s) 520 or from a Hardware Abstraction Layer (HAL), or a Basic Input Output System (BIOS), or a Virtual Machine Monitor (VMM), or a hypervisor or an operating system (OS) having a data structure mirroring the fields of register(s) 520. In some embodiments, the OSID may reside in a protected register field OSID 514A that is controlled by a BIOS/Hardware Abstraction Layer (HAL) or a Virtual Machine Monitor (VMM), or a hypervisor in program block 206 (sometimes a host operating system working as a hypervisor); the BIOS/HAL/VMM/hypervisor/OS may set the OSID value specific to itself or a value specific to a guest operating system into the OSID protected register field. The ASID may reside in an operating system (OS) controlled protected register field like ASID 512A.

The other optional identifier(s) 516 such as, for example, a login id (LOGIN) denoting process ownership, and/or a process identifier (PID) of an executing process, and/or a thread id (TID) of an executing group may be taken, for example, from a data structure in memory or from control register field(s) 518. The LOGIN field may further comprise or also be referred to as a Process Group Identifier (GID) in some embodiments. At the time of inserting a translation into a pagelet translation lookaside entry, the HAL/VMM/hypervisor/host OS writes (or copies) the OSID of an operating system (or sometimes OSID of itself) into the PTLB entry. The operating system in turn may update the ASID field based on the LOGIN or GID or PID or TID associated with an executing thread or process that is associated with the TLB entry and/or the page of memory that the translation is associated with.

The physical side 504 of the pagelet translation lookaside entry 500 comprises a physical page number/physical frame number such as physical page number 312 or physical page number 338, a plurality of pagelet states such as pagelet state 336, pagelet state 334, pagelet state 332 & pagelet state 330 or page/pagelet state 350, and a size/mask 302, as appropriate. The physical side 504 may further comprise. an access attribute 328, a lock attribute 308, a protection field 304, a Type 306 or Type 326 and/or an operation permission field 346 as appropriate. The physical page number (physical frame number) is used to compute the physical page address to access the page in a physical memory. It must be noted that it is not important that any specific field be in the physical side 504 or the virtual side 502. Almost all of the above fields can be placed on one side or the other with minor changes to the implementation to achieve the same functionality, in an embodiment.

Figure 7:
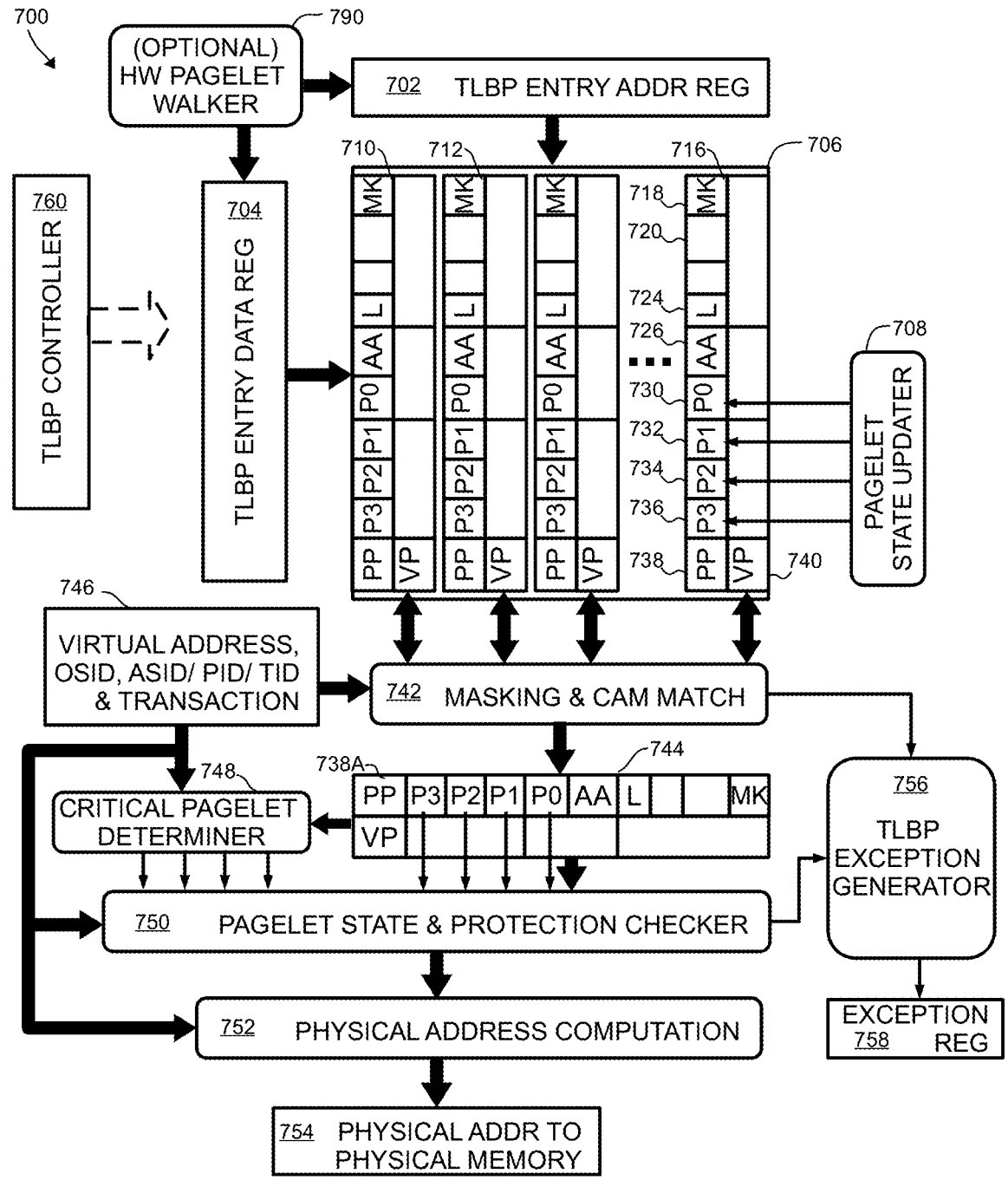
FIG. 7 is a block diagram illustrating an example of a pagelet translation lookaside buffer that handles pages with pagelets, in accordance with one possible embodiment.

The pagelet translation lookaside entry 500 (PTLE 500) resides in a pagelet translation lookaside buffer (PTLB) that handles pages having pagelets such as instruction PTLB 118 or data PTLB 122. The contents of pagelet translation lookaside entry 500 can be inserted into a PTLB either using a hardware mechanism such as a hardware pagelet walker 790 (FIG. 7) or an instruction such as a translation insertion instruction 530. The contents of a pagelet translation lookaside entry may be created as a translation in a data structure in memory, or in a register, and the translation may be inserted into the pagelet translation lookaside entry 500 during operation; or the translation may reside in a cache or a higher level PTLB from which it may be brought and inserted into PTLE 500. In one embodiment, the translation insertion instruction 530 comprises a mnemonic/opcode such as TRANS.INSERT and one or more operands. In one embodiment, the translation insertion instruction 530 may implicitly or explicitly take an entry number (ENTRY_NUM) to mark a location in a PTLB where the translation may be placed. In some embodiment, a translation insertion instruction 530 may implicitly or explicitly take an operand such as a register or a memory location or an immediate operand that contains the virtual side 502 of the translation. Also, the translation insertion instruction 530 may implicitly or explicitly take the physical side 504 of the translation from a register or from a memory location such as a page table entry or from an immediate operand. The translation insertion instruction 530 then creates and writes the translation into the pagelet translation lookaside entry 500 (in this example, the PTLB entry located at ENTRY_NUM), and if successful, the translation insertion instruction 530 retires without generating or triggering an exception to complete the transaction. Sometimes the pagelet states may need to be updated after inserting/writing the translation in the TLB entry, to correctly reflect the states of the pagelets. In some embodiment, the translation (wholly or partially) may reside in a memory from where it may be transferred into the pagelet translation lookaside entry 500 using the translation insertion instruction 530 or the hardware pagelet walker 790 (FIG. 7).

In another embodiment a translation insertion instruction may take a translation from a data structure in memory or a register and insert the translation into a translation entry such as, for example, the pagelet translation lookaside entry 500 residing in a pagelet translation lookaside buffer.

Figure 6:
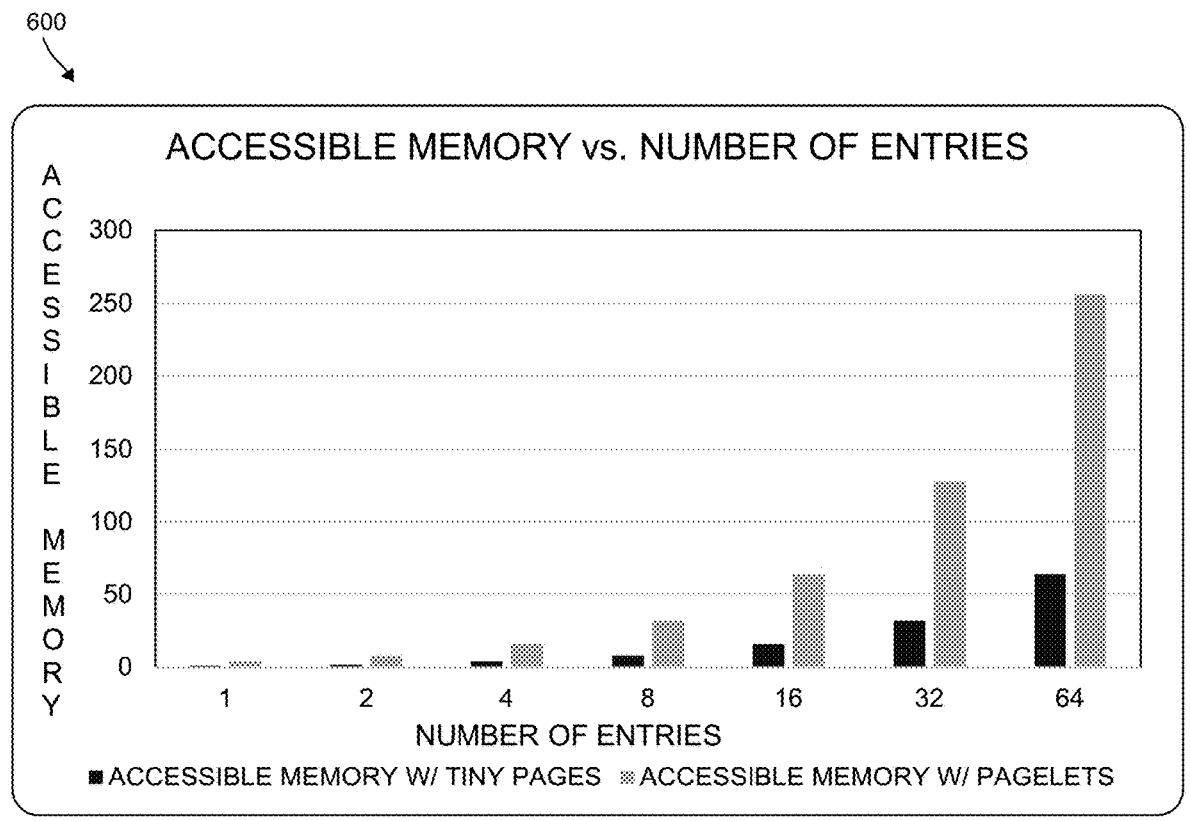
FIG. 6 shows a graph of accessible memory versus number of entries in a pagelet translation lookaside buffer that handles pages with pagelets, and which also handles legacy pages, in accordance with one embodiment.

FIG. 6 shows a graph of accessible memory versus number of entries in a pagelet translation lookaside buffer that handles pages with pagelets and handles legacy pages, in accordance with one embodiment.

In the graph 600, as applicable for one embodiment, a pagelet translation lookaside buffer (PTLB) that handles pages with pagelets, and also handles legacy pages (conventional pages) is considered for the amount of memory that is immediately accessible after a translation without a pagelet translation lookaside buffer miss with a possible stipulation on the maximum size of the smallest unit of data transfer on a page fault. In the legacy systems, legacy tiny pages as small as 1 KB are used to efficiently handle page faults. However, in a virtual memory system using pagelets, a page can have a number of pagelets with a pagelet as small as a legacy tiny page, and yet the page comprising pagelets would be bigger than a legacy tiny page. The graph shows that in an embodiment using four pagelets per page the accessible memory without a pagelet translation lookaside buffer miss increases by four times, and yet the smallest unit of transfer, which is a pagelet, remains the same as the size of a legacy tiny page. This is possible because in this embodiment four pagelet states are accommodated in one page table entry and an individual pagelet can be transferred independent of the other but does not need additional entries in a PTLB. In the graph 600, the number of entries is on the horizontal axis while the typical accessible memory without a pagelet or page translation lookaside buffer miss (as per a case) is on the vertical axis. Each series of bar graphs shows the corresponding size of accessible memory without engendering a pagelet translation lookaside buffer miss. In an embodiment, it is expected (but not guaranteed) that any translation set (cached in the pagelet translation lookaside buffer) of pages with pagelets will suffer fewer misses over the entire range of memory accesses than a similar translation set (cached in the pagelet translation lookaside buffer) of legacy tiny pages within a program context.

FIG. 7 is a block diagram illustrating an example of a pagelet translation lookaside buffer 700 (PTLB 700) that handles pages with pagelets, in accordance with one possible embodiment. Optionally, the PTLB 700 may be implemented in the context of any of the foregoing figures.

In one embodiment as shown in FIG. 7, a pagelet translation lookaside buffer like PTLB 700 that handles pages with pagelets may comprise one or more translation entries such as entry 710, entry 712 through entry 716 in a PTLB memory 706 (typically a content addressable memory (CAM)) coupled to a content matching port 742. Content matching port 742 may further comprise logic to perform a masking operation to mask one or more bits of a virtual address to be accessed in a transaction, and to process other fields such as access control identifier(s), and/or the prevailing privilege level, etc., received from one or more register(s) 746. Register(s) 746 hold a virtual address and other information like access control identifier(s) such as OSID/ASID/PID/TID and transaction type (read, write, probe, snoop, etc.). The PTLB entries such as entry 710, entry 712 through entry 716 (as in FIG. 7) individually hold various translations (identified by their respective entry numbers). One of the functions of the PTLB is to receive a virtual address in register(s) 746 and match it with the translations held in the PTLB memory 706 using the content matching port 742 to identify and produce a matching translation entry (i.e., matching entry) as a result that is saved in register 744. A translation entry comprises pagelet validity indicators that are individually associated with the respective pagelets. The translation entry is further associated with pagelet dirty indicators that are individually associated with the respective pagelets. The pagelet state indicators associated with the translation entry comprise these pagelet validity indicators and pagelet dirty indicators associated with the respective pagelets. The matching translation also comprises pagelet state indicators which are checked at the time of matching as a part of the content matching operation. The pagelet state checking may happen in response to the content matching operation in some embodiments.

In FIG. 7, for example, in one embodiment, the virtual address in register(s) 746 is masked using the mask such as MK 718 in entry 716 to remove the bits which make up the offset in page (or page offset) (typically some lower bits) as known in the art. Masking is the process of ignoring certain bits in an operand in a comparison or match operation. The unmasked bits of the virtual address that make up the page number are compared with the virtual page number 740 in entries such as in entry 716; and this process of matching is concurrently done with the virtual page numbers in other relevant entries also to produce a result. It is possible in some embodiments, to perform the comparison or content matching and then masking the page offset positioned bits before producing a final result. The exact process of content matching CAM entries which a content matching unit may follow may be different in different embodiments. In many embodiments, the PTLB memory 706 and the content matching port 742 may be combined into a content addressable memory (CAM) with CAM ports to mask and match content and access associated data. In some embodiments, the pagelet state(s) may be checked during the matching operation to discard any potential matches with Invalid or Absent or Page Not Present (PNP) page states.

The virtual address in register(s) 746 is also input to a critical pagelet determiner 748 to determine the pagelet that contains the addressed memory location associated with the virtual address. The critical pagelet determiner 748 determines a critical pagelet of the executing transaction and indicates it to the pagelet state and protection checker 750 coupled to the critical pagelet determiner 748. The determined/identified critical pagelet contains the addressed memory location (with the data of interest) associated with the virtual address held in register(s) 746. The pagelet state and protection checker 750 is also coupled to register 744 which holds the matching entry. If in one instance, entry 716 was found to be the matching entry by the content matching port 742 (performing Masking and CAM matching), then it would be held in register 744 during the course of that transaction.

As used herein, the term critical pagelet associated with a transaction is a pagelet that contains the addressed location associated with a transaction. It is determined by examining one or more bits at specific locations of the virtual address or physical address. The critical pagelet would typically need to be accessed to complete the transaction. For example, in some embodiment, when bit 31 down to bit 14 of an address refer to a page number or a physical page frame, then assuming four pagelets in the page, bit 12 & bit 13 together, would determine the pagelet offset, while the bit 0 through bit 11 would determine the location offset of the addressed location in the pagelet. The critical pagelet could be determined by examining the pagelet offset of the addressed location in a transaction. In addition to critical pagelets, semi-critical pagelets are those pagelets that are not instantly critical for a transaction but are expected to become critical almost immediately thereafter (for e.g., expected to become critical within next 1001 instructions executed). The non-critical pagelets are those pagelets that are not deemed critical or semi-critical at a given point in time.

The matching entry in register 744 is received by the pagelet state and protection checker 750 and the critical pagelet state and protection fields are checked to verify that the critical pagelet is present in the physical memory and that the translation is valid. The pagelet state and protection checker 750 may also check/verify whether the transaction is allowed to access the addressed memory location and whether an operation associated with or involved in the transaction (for e.g., a read or write operation) can or cannot be performed. The transaction or operation is allowed to be continued in response to an access allowance (on not failing the access check) by the protection checker 750.

In the instant example, the pagelet state and protection checker 750 receives the matching entry 716 having pagelet states given by pagelet state 730, pagelet state 732, pagelet state 734 & pagelet state 736 for respective pagelets P0, P1, P2 & P3. One from these pagelets P0, P1, P2 & P3 is identified as critical by the critical pagelet determiner 748 using the address of the addressed memory location and indicated as critical. In response to the critical page identification by the critical pagelet determiner 748, the pagelet state of the critical pagelet may be checked by the pagelet state and protection checker 750 to determine if the critical pagelet is present in the memory; and further, the protection attribute 720 is matched against the transaction type and the prevailing current privilege level (CPL) to determine if the critical pagelet may be accessed for completing the transaction. As understood in the art the current privilege level (for example, Supervisor versus User) is the privilege level at which an operation is executed at a given point in time by an agent inside a system or by an agent using a system, and which privilege level selectively controls access to resources in a system.

In the instant example, the matching entry 716 also comprises a physical page/frame number PP 738 which may be copied into the register 744 (into physical page/frame number 738A). The virtual address and the matching entry in register 744 are forwarded (at least in part) to the physical address computation logic block 752 that uses the critical pagelet number (or indicator) and the virtual address to determine a valid pagelet offset. The physical page/frame number 738A, the valid pagelet offset, and the data offset in page are used to compute the physical address in the physical address computation logic block 752 in order to access the addressed memory location in physical memory. The physical address may optionally be written to a memory address register 754 as it may be sent forward to access a cache such as instruction cache 116 or data cache 120 to access data, and/or to a memory controller 130 to access data from a coupled physical memory. The memory address register may be part of a queue, or a FIFO or a register file or may simply be a set of latches. In case the masking and content matching fail via the content matching port 742 working in conjunction with PTLB memory 706 and no matching entry is obtained, then an exception is raised by the PTLB exception generator 756 and stored into an exception register 758 for further action. The exception raised in this case would typically be a PTLB miss related exception.

Another case is when the pagelet state and protection checker 750 or the pagelet state and protection checker determine that the critical pagelet state is invalid or the critical pagelet is not present in the memory, an exception is raised via the PTLB exception generator 756 and stored in an exception register 758. This exception could also indicate a PTLB miss. In yet another case, if the pagelet state and protection checker 750 determines that the transaction is not allowable and violates security or authorization failure, a protection failure related exception is raised via the PTLB exception generator 756 which is then received and held in exception register 758. The PTLB related software handler handling the generated exceptions would then take appropriate action. The PTLB related software handler may be a component of an operating system or a hypervisor.

The PTLB logic also comprises a PTLB address register 702 and a PTLB data register 704 for inserting or writing contents into the entries of the PTLB memory 706. PTLB address register 702 holds address of the entry (or part thereof) in the PTLB memory 706 into which PTLB translation data is being written while the PTLB translation data itself is held in a PTLB data register 704 from which the data is transferred into the PTLB memory 706. When a translation is successfully used to generate a physical address and used to access, read, write or modify the data in a critical pagelet associated with the translation, the pagelet state may be updated, and this is done by a pagelet state updater 708. In some embodiments, the pagelet state updater may work under the control of a PTLB controller 760. When a PTLB entry such as entry 716 is locked using a lock attribute L 724, the PTLB controller 760 may not allow the entry 716 to be replaced. This allows certain commonly used pages to be not replaced in the PTLB till the lock is turned off (unlocked). Further, the access attribute 726 in entry 716 may be used to control the access type of the transaction involving the associated page or pagelets.

The PTLB controller 760 controls the activity and functionality of the PTLB 700 and is coupled to one or more blocks of the PTLB 700 to handle pages with pagelets. The PTLB controller 760 may be configured and controlled by a computer program product. The PTLB controller may contain several registers that may be programmed (written to and/or accessed and read) by the computer program product to configure and control the operations of PTLB 700. The PTLB controller 760 may control any of the entities/logic units of PTLB 700.

The pagelet translation lookaside buffer that handles pages having pagelets such as PTLB 700 may optionally work in conjunction with a hardware pagelet walker 790 capable of handling individual pagelets and the hardware pagelet walker 790 may also be controlled by the PTLB controller 760. The hardware pagelet walker 790 may also implement any of the cache replacement algorithms, and also work to copy translations from higher level pagelet translation lookaside buffers and/or automatically create a translation and insert into a PTLB, upon a PTLB miss, with or without the assistance of a translation insertion instruction.

It must also be taught that in some embodiments, not all of the PTLB 700 components need be implemented in a pagelet translation lookaside buffer that handles pages with pagelets. In some embodiments, it may be possible to implement pagelet handling logic inside a memory controller wherein the physical pagelet address computation can be done inside the memory controller and the critical pagelet can be brought into the memory from secondary storage prior to the other pagelets in the page. This may allow a page faulted computation to proceed conditionally and concurrently while an entire page is brought into memory and its state adjusted. In some embodiments, not using a pagelet translation lookaside buffer, it may still be possible to incorporate some of the techniques described herein to bring in pagelets without a translation mechanism in order to present them to a requesting agent like a processing unit, when pagelet states are maintained and updated.

Figure 8A:
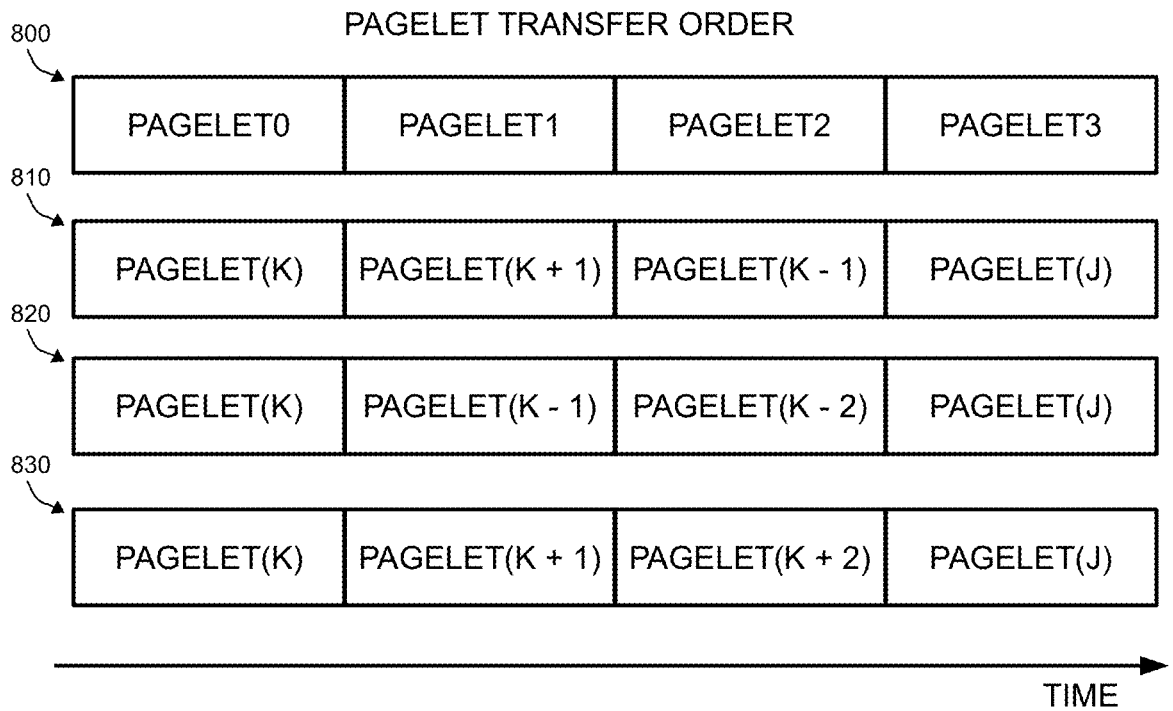
FIG. 8A illustrates some examples of alternative pagelet transfer orders, in accordance with one possible embodiment.

FIG. 8A illustrates some examples of alternative pagelet transfer orders, in accordance with one embodiment. Optionally, the alternative pagelet transfer orders such as 800, 810, 820, 830, etc., may be implemented in the context of any of the foregoing figures, or in any other environment. Pagelets in a physical page are transferred between a physical memory and a secondary storage as the physical page is brought into or evicted out of the physical memory, as the case may be. In some embodiments, the transfer of pagelets and pages may happen between two memory systems where both are physical memories, or both are secondary storages. Some transfers may happen across multiple nodes in a network where a pagelet transfer may occur between the nodes in a distributed system. Such a pagelet transfer may be part of a page transfer or may simply be to sync up pagelets across memories in the distributed system, and it may be accompanied by the transfer of pagelet states, attributes, and translations along with the pagelets. For e.g., a primary physical memory may be on one node of a distributed system and the secondary storage may be on a different node; the two nodes may not even be in geographical proximity and may instead be on different places connected by an internetwork. In such embodiments, minimizing transfer latencies and bandwidth is of utmost importance where conventional methods underperform the pagelet transfer mechanisms disclosed in here.

In FIG. 8A, in pagelet transfer order 800, the pagelets of a page arranged as PAGELET0, PAGELET1, PAGELET2 and PAGELET3 are transferred, for example, from a secondary storage such as secondary storage 138 to a memory 136, in the same order starting with PAGELET0. Such a transfer may occur on a page fault wherein a transfer via Direct Memory Access (DMA) transaction may be set up to transfer the pagelets as per the pagelet transfer order 800.

During operation, in some other instance if the faulting address resides in PAGELET1 of the absent page, wherein the data may be accessed first from PAGELET1, followed by PAGELET2, further followed by PAGELET0, this makes PAGELET1 a critical pagelet of that page at that instance. The transfer order for a Direct Memory Access transaction (DMA transaction) can then be set up as PAGELET1, PAGELET2 followed by PAGELET0. This is illustrated in pagelet transfer order 810 which starts with some critical PAGELET(K) followed by the next pagelet PAGELET(K+1) followed by a PAGELET(K−1); with K=1, we get the scenario described above. This DMA set up may be done in hardware and/or it may be partly assisted by a software handler that handles the page fault.

Pagelet transfer order 820 illustrates a scenario where pagelets are expected to be accessed in a descending order, where the critical pagelet is PAGELET(K) which is transferred and accessed first, followed by transfer of PAGELET(K−1) and then PAGELET(K−2). Thereafter, some pagelet (J) may be transferred.

Figure 8B:
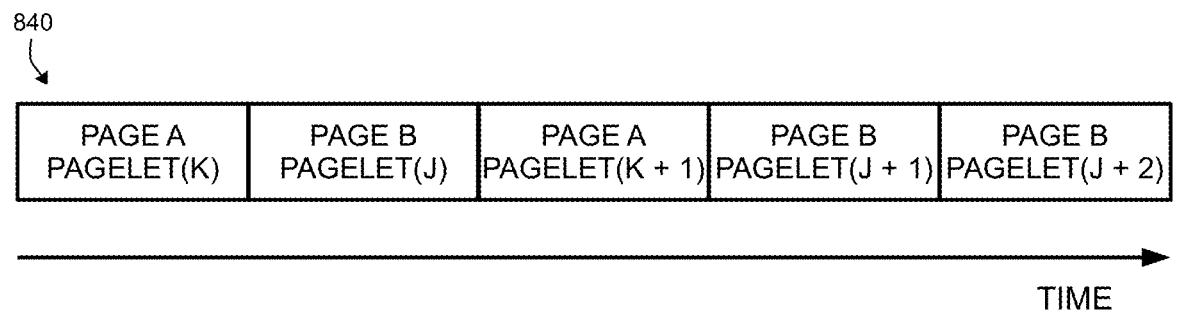
FIG. 8B illustrates an example of interleaved page transfer order of two pages comprising pagelets, in accordance with one possible embodiment.

Pagelet transfer order 830 illustrates the scenario where pagelets are transferred in an ascending order starting with some critical PAGELET(K). The PAGELET(K) identified as critical is transferred the earliest in a page transfer FIG. 8B illustrates an example of interleaved pagelet transfer order 840 involving two pages each comprising pagelets, in accordance with one embodiment. Optionally, the interleaved pagelet transfer order 840 may be implemented in the context of any of the foregoing figures, or in any other environment. In the interleaved pagelet transfer order 840 two pages may be concurrently transferred from a secondary storage to a memory. For example, during operation, in one instance, interleaved transfer may happen if two computing threads encounter page faults that need to be serviced concurrently. When there are two critical pagelets, a critical PAGELET(K) in a critical PAGE A and a further pagelet PAGELET(J), also critical in PAGE B that is also critical, the two pagelets are transferred before other adjoining pagelets in PAGE A and PAGE B are transferred as shown in the interleaved pagelet transfer order 840. This makes for pagelets of different pages to be transferred in an interleaved order and the DMA would be programmed as such.

Figure 8C:
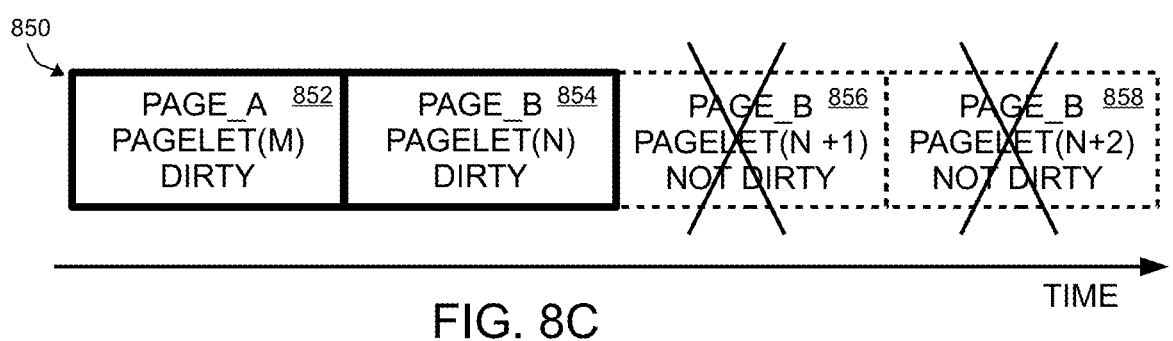
FIG. 8C illustrates an example of a page eviction transfer involving a dirty pagelet in a page, in accordance with one possible embodiment.

FIG. 8C illustrates an example of a page eviction transfer 850 involving a dirty pagelet in a page, in accordance with one possible embodiment. Optionally, the page eviction transfer 850 may be implemented in the context of any of the foregoing figures, or in any other environment. In one example embodiment, when a page PAGE_B with a dirty pagelet 854 (PAGELET(N)) is evicted from a memory to a secondary storage, only the dirty pagelet 854 of PAGE_B is transferred. Any other pagelets such as pagelet 856 and pagelet 858 that are not dirty are not transferred during an eviction process. Similarly, only the dirty pagelet PAGELET(M) 852 of another page PAGE_A is transferred during eviction of PAGE_A. In some embodiment, during eviction, pagelets that are not dirty can simply be written over without transferring them when they remain unmodified and their copies in memory and secondary storage remain identical.

In some embodiments the pagelet transfer may happen across nodes and across memories that are on different nodes of a distributed computing system. Even the secondary storage may reside on some remote node and a pagelet transfer may span multiple nodes and multiple protocols.

This may involve multiple DMA transfers and may further involve transfer of pagelets of pages across nodes using some datagram and/or transport control protocols and/or some asynchronous transfer protocols across multiple network and/or internetwork segments (for e.g., wide area network). The transfer order of pagelets may be on a best effort, best cost basis or a best performance basis or a least latency basis with or without guarantees, and on isochronous channels and/or non-isochronous channels. The pagelet transfer may be tagged along with an accompanying pagelet state and attribute transfer to keep the pagelet information correct and current. When only the dirty pagelets need be transferred across remote nodes there may be considerable savings in latency, bandwidth, congestion cost and other related costs including power and energy. In conventional systems, the entire pages would need to be transferred even if only one pagelet portion of data is modified, thereby increasing the costs. The critical transfer of multiple pagelets of a first page and a second page in an interleaved manner allows to minimize the transfer latencies of both the pagelets over a conventional mechanism where pages are transferred prior to use. In the embodiments discussed in FIG. 8A and FIG. 8B, the data is used as soon as a critical pagelet containing the data completes transfer without waiting for whole pages to be transferred while still maintaining integrity of pagelet states. Conventional methods use various page pre-fetching schemes to hide page latencies which can increase power, reduce memory performance and available bandwidth, and prefetch pages into memory that may never be used. These issues are mitigated in the embodiments disclosed in here while allowing for fewer translation entries and smaller page tables to save power and increase performance.

Figure 9:
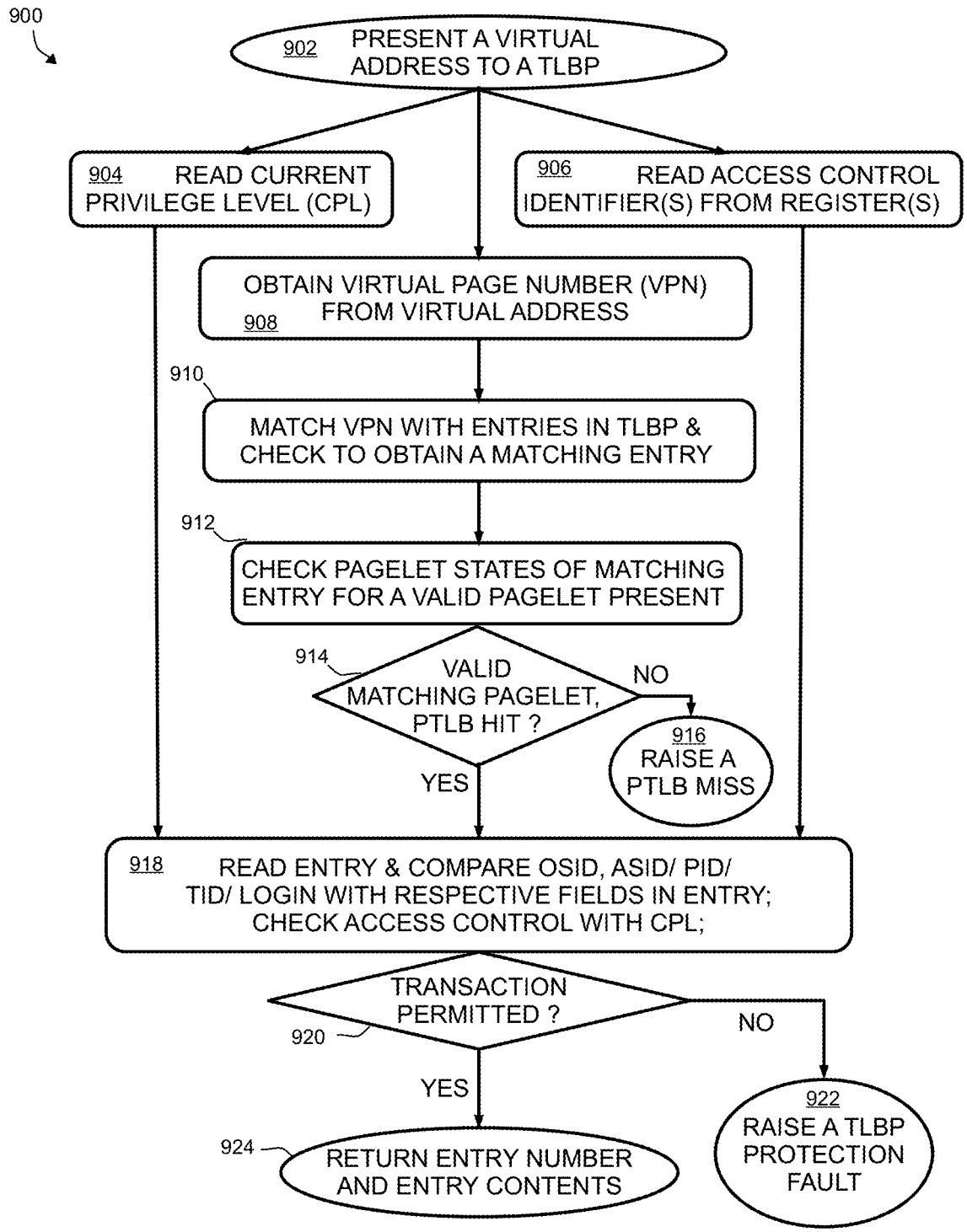
FIG. 9 illustrates an example of a method to probe a pagelet translation lookaside buffer that handles pages with pagelets, in accordance with one possible embodiment.

FIG. 9 illustrates an example of a method 900 to probe a pagelet translation lookaside buffer (PTLB) that handles pages with pagelets, in accordance with one possible embodiment. Optionally, the method 900 may be implemented in the context of any of the foregoing figures, or in any other environment.

In method 900, in step 902 a virtual address is presented to a pagelet translation lookaside buffer (PTLB) that handles pages having pagelets such as PTLB 700. In step 904, the current privilege level (CPL) is accessed/used by the PTLB controller to authenticate the access and authorize one or more instructions used to probe the PTLB. In step 906, one or more access control identifier(s) from the group comprising an operating system identifier (OSID), an address space identifier (ASID), a process identifier (PID), a thread identifier (TID), or a login or ownership identifier (LOGIN) is read from one or more registers, or one or more data structures held in a memory or storage. In step 908 a virtual page number (VPN) is obtained from the virtual address of step 902. In some embodiment, in some instance, a VPN may be obtained by using a mask such as mask MK 718. In some other instances, the mask may be a default value that masks away certain low order bits of the virtual address. While the masking process is typically implemented in hardware, it is possible that some or all of it may be implemented in software, in some embodiment. In step 910, a VPN is matched with one or more entries residing in the PTLB (in a content addressable memory) and checked to obtain a matching translation entry (i.e., matching entry). It is also possible in some embodiments, that one or more VPNs may be temporarily computed in steps 908 and 910 using one or more mask values to be matched with corresponding PTLB entries. In step 912 the pagelet state(s) in the matching entry are checked to determine if a valid pagelet is present. If a valid pagelet is present, then a pagelet hit occurs and a PTLB hit (pagelet translation lookaside buffer hit) is generated. The valid pagelet present would be the critical pagelet associated with that virtual address. If no valid pagelet is found in step 914, then a pagelet miss occurs, and a PTLB miss (pagelet translation lookaside buffer miss) may be generated in step 916.

In some embodiments, in step 916 a value indicating absence of a valid matching page/pagelet may be written into a register. If in step 914, a matching valid pagelet hit occurs, and a PTLB hit (pagelet translation lookaside buffer hit) is generated, in step 918 the matching entry is read and compared with one or more access control identifier(s). In step 918 and step 920, one or more access control identifier(s) such as OSID and/or ASID and/or PID and/or TID and/or LOGIN fields of the matching entry may be compared with the corresponding fields read in step 906 to determine if the probe transaction is permitted and can be completed. Further, in step 918 and step 920 one or more access control identifier(s) such as OSID and/or ASID and/or PID and/or TID and/or LOGIN may also be used in an authentication process involving the current privilege level (CPL) from step 904, to determine whether the probe transaction can be allowed to complete at that current privilege level.

For example, in some embodiment, if a user initiates the probe without proper authentication at a current privilege level of USER (instead of SUPERVISOR), the probe transaction could fail. However, if for example the user makes a system call and the operating system initiates the probe transaction with a CPL equal to SUPERVISOR then the probe transaction could successfully complete. If in step 920 it is determined that the transaction is not permitted then an exception is raised in step 922 to indicate a protection failure, or in some embodiment, more specifically, a PTLB protection failure. If in step 920 it is determined that the probe transaction is permitted, then in step 924 the contents of the matching entry may be written into a register and/or the entry number is written into a register, or the matching entry contents and the entry number may be returned to a handler in a memory location or written into MMIO register(s).

It may be noted that some of the steps in method 900 may be omitted, or merged with other steps, or split into multiple steps in some embodiments. It is also possible that some additional steps may be added into the method in some embodiments. For example, in some embodiments, or under some conditions the PTLB miss 916 may not be raised as an exception in response to a PTLB miss and instead, a flag may be raised or a value indicating a miss may be written to a register or memory. Finally, any steps or sequence of steps from method 900 may be combined with other methods or parts of other methods to perform the same task or to combine multiple tasks. The above and the following description of the embodiment(s) are merely exemplary (illustrative) in nature and are in no way intended to limit the invention, its application, or uses. Additionally, the invention may be practiced according to the claims without some or all of the illustrative information.

Figure 10:
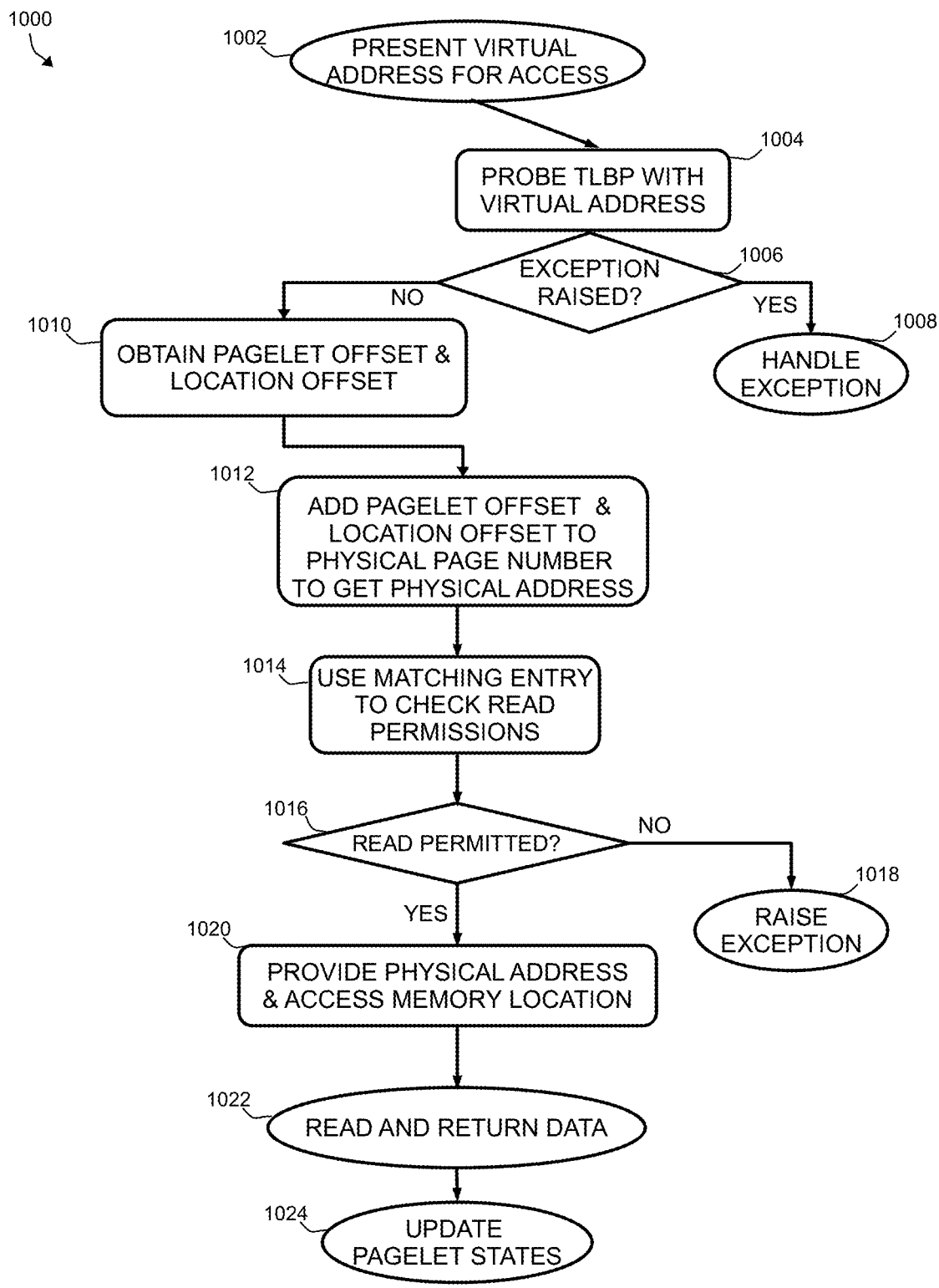
FIG. 10 illustrates an example of a method of reading a memory location in a pagelet, in accordance with one possible embodiment.

FIG. 10 illustrates an example of a method 1000 of reading a memory location in a pagelet, in accordance with one possible embodiment. Optionally, the method 1000 may be implemented in the context of any of the foregoing figures, or in any other environment.

In some embodiment in FIG. 10, in method 1000, a virtual address for accessing a memory location or MMIO location for reading data is presented in step 1002. The virtual address or an associated virtual page number is presented in step 1004 to a pagelet translation lookaside buffer (PTLB) that handles pages having pagelets in order to probe and obtain a matching PTLB entry. If the probe in step 1004 fails to match a valid entry and produce a valid result, a failure is detected in step 1006 and an exception may be raised in step 1006. If an exception is raised in step 1006, then in step 1008 the exception is handled. The exception may be generated using a PTLB exception generator 756 in some embodiments. In some embodiment, the exception may be handled in the exception handling unit 110. Otherwise, if in step 1006 no exception is generated, the contents of a valid matching entry obtained in the probe are forwarded. In some embodiments, upon a PTLB miss an exception may not be generated due to exception masking, or to process the miss silently. In such an event, a flag may be raised, or a status value may be written into a register or memory in response to the miss for further action.

In step 1010, a virtual page number (VPN) is determined along with a critical pagelet and location offset. A critical pagelet offset is also obtained; the critical pagelet offset must be a valid pagelet offset. The physical page number (physical frame number) is obtained from the valid matching entry. The physical page number (physical frame number) is used to compute the physical page address (physical frame address) and added to the valid pagelet offset to obtain a physical pagelet address; the physical pagelet address and the location offset are used in step 1012 to compute a valid physical location address to access in the physical memory space. For example, in some embodiment, if the location offset is with respect to a pagelet frame, then the physical pagelet address is simply added to the location offset to obtain the physical location address.

In step 1014 the valid matching entry of the page is used to check permissions to perform a read/access the physical memory address at the current privilege level and a decision is made in step 1016 which either allows or denies the permission to read/access the memory location. In some embodiments, step 1014 and step 1016 may also involve processing by a memory protection unit that checks regions of memory or MMIO devices allowed to be accessed for a read transaction at a given privilege level by a process or an agent. If the permissions check in step 1016 fails (e.g., the read transaction is not permitted) then in step 1018 an exception is raised. Otherwise, if a read transaction is permitted in the permissions check of step 1016, then in step 1020 the physical address is provided to a memory controller or a cache controller for accessing the location to read the data. In some embodiments, under certain conditions, the exception in step 1018 may not be raised and instead a flag may be raised or a status value indicating a protection check failure may be written to a register or memory.

In step 1022 the data is read and returned to the unit seeking to obtain the data. It may be noted that if the data is an instruction stream or a portion of an instruction stream the data may be returned into an instruction buffer; and if the data is a memory or MMIO operand then it may be returned to a load-store or some other unit seeking to obtain that data. In step 1024, in some embodiments, the pagelet state in the matching PTLB entry may be updated to reflect that the data has been accessed for a read operation. For instance, the pagelet state may be changed in one example, from PPNA (PAGELET PRESENT, NOT ACCESSED) to PAND (PAGELET ACCESSED NOT DIRTY).

Figure 11:
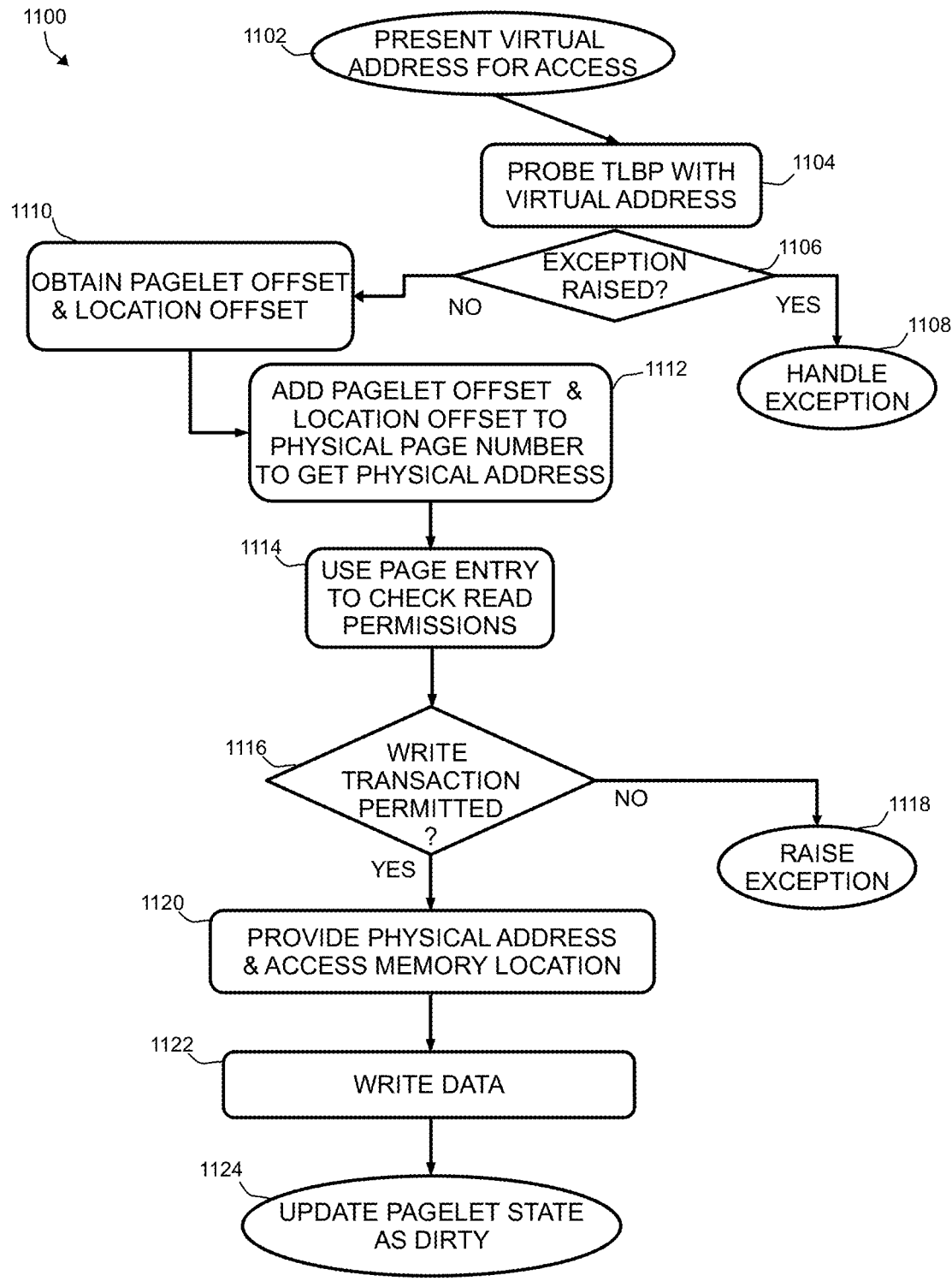
FIG. 11 illustrates an example of a method of writing to a memory location in a pagelet, in accordance with one possible embodiment.

FIG. 11 illustrates an example of a method 1100 of writing to a memory location in a pagelet, in accordance with one possible embodiment. Optionally, the method 1100 may be implemented in the context of any of the foregoing figures, or in any other environment.

In some embodiment in FIG. 11, in method 1100, a virtual address for accessing a memory location or an MMIO location is presented and received in step 1102. The virtual address or the associated virtual page number is presented in step 1104 to a pagelet translation lookaside buffer (PTLB) that handles pages having pagelets in order to probe and obtain a matching PTLB entry. If the probe in step 1104 fails to find a matching valid entry as result, a failure is detected in step 1106 and an exception may be raised in step 1106. If an exception is raised in step 1106, the exception is handled in step 1108. The exception may be generated using a PTLB exception generator 756 in some embodiments. In some embodiment, the exception may be handled by the exception handling unit 110. Otherwise, if in step 1106 no exception is generated the contents of a valid matching entry obtained in the probe are forwarded.

In some embodiments, under some conditions, upon a PTLB miss, an exception may not be generated due to exception masking, and/or a configuration to process the miss silently. In such an event, a flag may be raised, or a status value may be written into a register or memory in response to the miss for further action.

In step 1110, a virtual page number (VPN) is determined along with a critical pagelet and location offset. A critical pagelet offset is also obtained; the critical pagelet offset must be a valid pagelet offset. The physical page/frame number (which may also be the physical page/frame address) is obtained from the valid matching entry and added to the valid pagelet offset to obtain a physical pagelet address, which may be used along with the location offset in step 1112 to compute a valid physical address to access the location in the physical memory. In step 1114 the valid matching entry of the page is used to check permissions to perform an access to write into the location at the physical memory address at the current privilege level; and a decision is made in step 1116 which either allows or denies the permission to write to the memory location. In some embodiments, step 1114 and step 1116 may also involve processing by a memory protection unit that checks regions of memory or MMIO devices allowed to be accessed for a write transaction at a given privilege level by a process or agent initiating the write transaction. If in step 1116 the permission check fails, for e.g., a write transaction is not permitted then in step 1118 an exception is raised. Otherwise, if a write transaction is permitted in response to the permission check of step 1116, then in step 1120, the physical address is provided to a memory controller and/or a cache controller and/or a device controller for accessing the location to write the data supplied. In some embodiments, under certain conditions, the exception in step 1118 may not be raised and instead a flag may be raised or a status value indicating a protection check failure may be written to a register or memory.

In step 1122 the data is written into the cache or memory location or MMIO location associated with the address. In some embodiments, a completion message may be returned to the load and store unit or some unit that initiated the write. In step 1124, the critical pagelet state is updated as DIRTY. It may be noted that in some embodiments, the step 1124 may not sequentially follow step 1122, and instead it may happen concurrently with or even before step 1122 starts or completes. In some embodiments, the order of steps may be different, and in some cases, steps may be merged, or a step may be split into multiple steps, or a step may be omitted. Additional steps may be included in this method, in some other embodiments.

Figure 12:
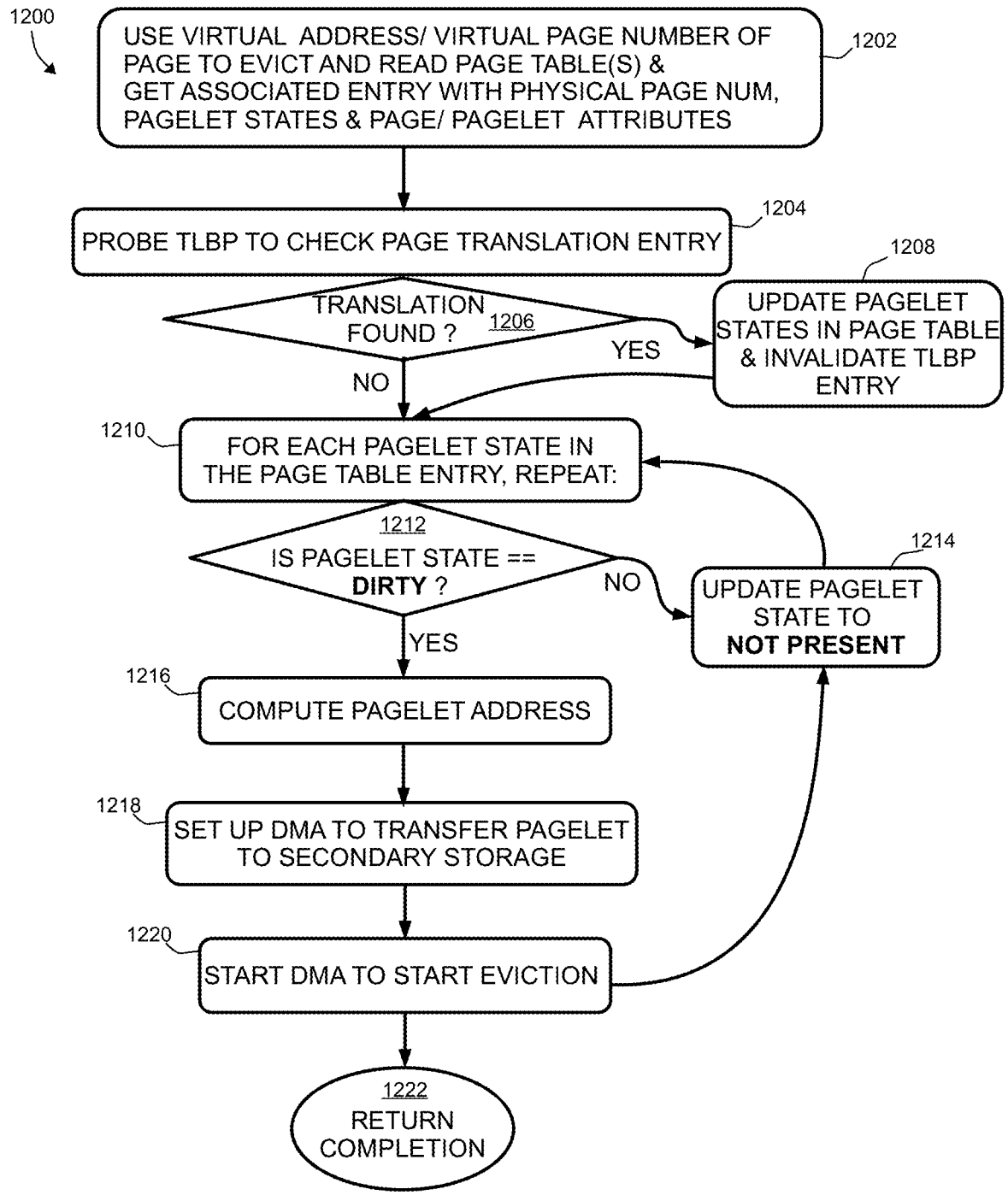
FIG. 12 illustrates an example of a method of evicting a page having pagelets from memory, in accordance with one possible embodiment.

FIG. 12 illustrates an example of a method 1200 of evicting a page with pagelets from memory, in accordance with one possible embodiment. Optionally, the method 1200 may be implemented in the context of any of the foregoing figures, or in any other environment.

In method 1200 in some embodiment of FIG. 12, in step 1202, a virtual address and/or virtual page number (VPN) of a page to be evicted is used to lookup one or more page tables to find an associated page table entry for that VPN. The associated page table entry is read to obtain the physical page frame number, the pagelet states, and the page and/or pagelet attributes. Typically, a pagelet aware entry replacement algorithm may be used to identify a good candidate page to evict. Entries that are no longer valid (e.g., those whose associated pages are not present, or those whose PID/OSID is out of context)) or entries that are least recently used or not recently used may be good candidates to evict. There may be other criteria that may be used to find a candidate page for eviction.

In step 1204, the virtual page number and/or the virtual address is provided to probe a pagelet translation lookaside buffer (PTLB) that handles pages having pagelets in order to check for a matching translation in the PTLB. In response to the probe in step 1204 a determination made in step 1206 indicates whether or not a matching translation has been found; and in response to finding a matching translation the matching entry is read from the PTLB. In step 1208, the latest pagelet states are read from the matching entry to update the pagelets states of the page translation entry in the associated page table. Thereafter, that matching translation in the PTLB entry is invalidated by marking the pagelet states as NOT PRESENT or INVALID as the case may be in some embodiment. If in steps 1204 & step 1206 no translation was found, then step 1210 is carried out. Otherwise, after the matching translation invalidation in step 1208 of the PTLB entry, the step 1210 is carried out.

In step 1210, for each pagelet state in the page table entry (corresponding to the respective pagelet in the page) the following steps may be conditionally repeated. In step 1212, it is checked whether a pagelet state is marked DIRTY; if it is not marked DIRTY, then in step 1214 the pagelet state in the page table entry is marked NOT PRESENT and/or INVALID so that the pagelet is no longer available and is considered evicted. If in step 1212, the pagelet state is found to be marked DIRTY and Present then in step 1216, the physical pagelet address (i.e., physical address of the pagelet in physical memory) is computed based on the valid pagelet offset and the physical page address (physical frame address); further, a secondary storage pagelet address is also computed based on the valid pagelet offset and the page location in the secondary storage (for e.g., logical block address, or for e.g., cylinder, head, sector, etc., or for example a non-volatile memory (NVM) page and block address).

In step 1218, a Direct Memory Access transaction (DMA transaction) is set up to transfer the DIRTY pagelet to secondary storage. The DMA transaction may use the primary and secondary pagelet addresses (for e.g., physical pagelet address and secondary storage pagelet address, respectively) (or primary and secondary page addresses) to set up the DMA transaction. In step 1220 the DMA transfer is initiated to start the pagelet eviction; and in step 1214 the pagelet is marked PAGELET NOT PRESENT (and/or PAGELET PENDING). The control is returned to step 1210 for the next iteration to check the next pagelet in the page. In response to the successful completion of DMA initiated in step 1220, a completion message is returned in step 1222, to the page handler that initiated the eviction process. In some embodiments, while the DMA is in progress the pagelet state may be marked Pagelet Pending in step 1214 till the completion message of step 1222 is received after which the pagelet state is marked Absent (PAGELET NOT PRESENT). This may be done to prevent another translation to be created using the pagelet while eviction is in progress. In general, in some embodiments, when a pagelet is in transit its state may be maintained internally as pending to preclude initiation of another transaction involving the pagelet. It may be taught that the method 1200 may be implemented in software by a page handler or at least in part in hardware in some embodiment using a hardware pagelet walker 790. Further, it is possible to implement the same functionality by rearranging the steps in a different order. For example, in some embodiment, the PTLB entry may be used to obtain the physical pagelet addresses, complete eviction of dirty pagelets and thereafter, the page table entry and the PTLB entry may be invalidated to indicate pagelets not present.

In some embodiments the pagelet transfer may happen across nodes and across memories that are on different nodes of a distributed computing system. Even the secondary storage may reside on some remote node and a pagelet transfer may span multiple nodes and multiple protocols. This may involve multiple DMA transfers, and also transfer of pagelets of pages across nodes using some datagram and/or transport control protocol and/or some asynchronous transfer protocols across multiple network and/or internetwork segments.

It may be noted that some of the steps in methods 900 through method 1200 may be omitted, or merged with other steps, or split into multiple steps or rearranged suitably in some embodiments. It is also possible that some additional steps may be added to the method in some embodiments. Finally, any steps or sequence of steps from methods 900 through method 1200 may be combined with other methods (or parts of other methods) to perform the same task or to combine multiple tasks. The above and the following description of the embodiment(s) are merely exemplary (illustrative) in nature and are in no way intended to limit the invention or the environment in which it may be operated, its application, or uses. Additionally, the invention may be practiced according to the claims without some or all of the illustrative information.

Figure 13:
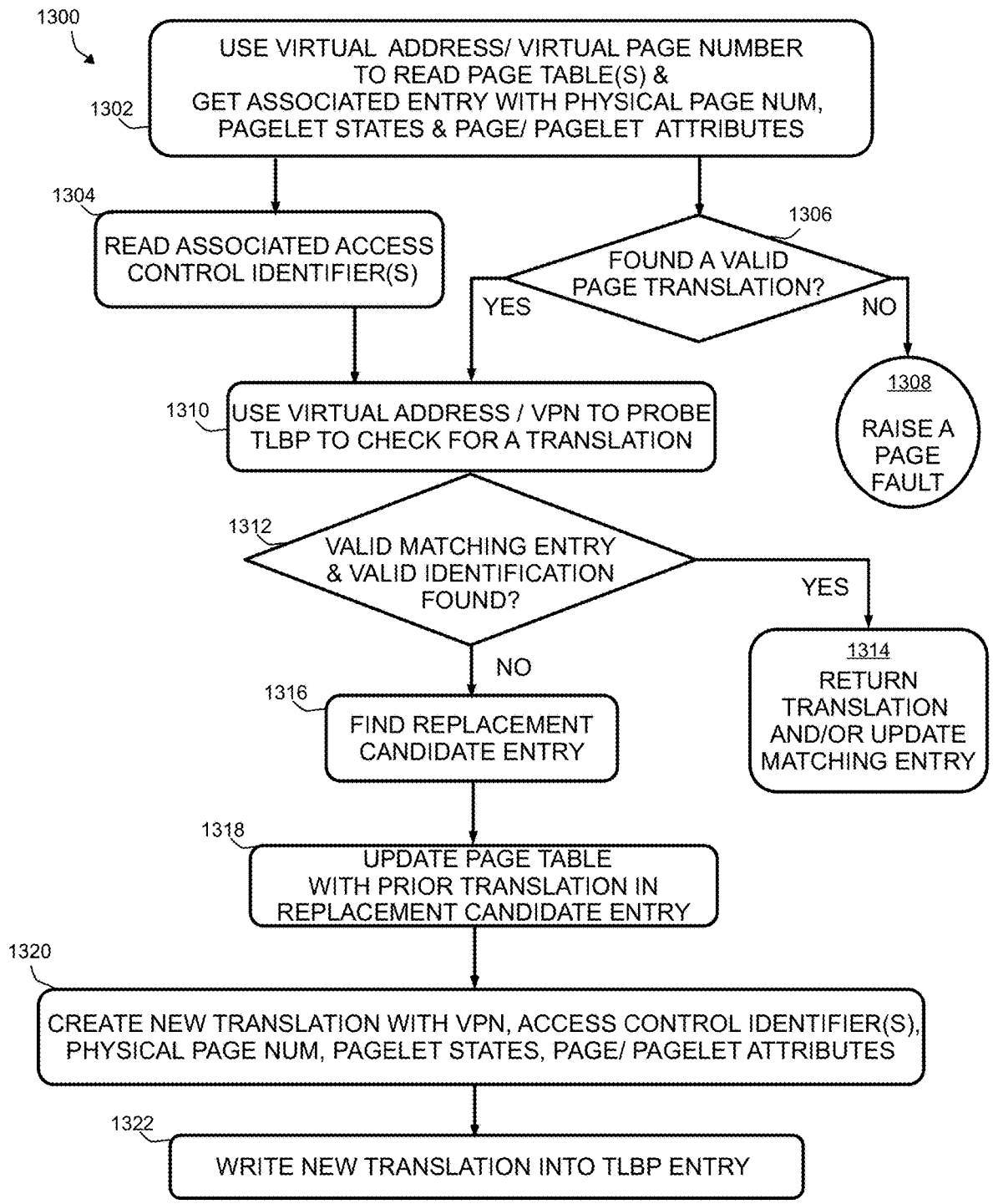
FIG. 13 illustrates an example of a method of inserting a translation entry for a page having pagelets into a pagelet translation lookaside buffer that handles pages having pagelets, in accordance with one possible embodiment.

FIG. 13 illustrates an example of a method 1300 of inserting a page translation for a page having pagelets into a pagelet translation lookaside buffer (PTLB) that handles pages having pagelets, in accordance with one possible embodiment. Optionally, the method 1300 may be implemented in the context of any of the foregoing figures, or in any other environment.

In method 1300 in some embodiment of FIG. 13, in step 1302, a virtual address and/or virtual page number (VPN) of a page is used to lookup one or more page tables to find an associated page table entry for that VPN. The associated page table entry is read to obtain the physical page frame number, the pagelet states, and the page and/or pagelet attributes. In step 1304, the associated access control identifiers such as the operating system identifier (OSID), and/or address space identifier (ASID), and/or process identifier (PID), and/or thread identifier (TID), and/or LOGIN, and/or process group identifier (PGID) are read from their respective register(s) and/or fields. In step 1306 it is verified whether the page translation in the page table entry for the VPN is a valid translation and/or a translation for a page at least partially present in the memory (for e.g., one or more pagelets of the translation may be present in the memory and the corresponding pagelet states are shown as present). If in step 1306, the page translation or pagelet state is found to be not valid, and/or the page is not present, or the pagelet is not present then a page fault exception may be raised in step 1308. Otherwise, if the page translation is valid, or the pagelet state is found to be valid or present, the VPN and/or virtual address is used to probe one or more pagelet translation lookaside buffer(s) that handle pages having pagelets in step 1310 to check for a matching translation entry. If in step 1312 it is verified that a valid matching translation entry has been found in the PTLB in step 1310, then in step 1314 the translation read from the matching translation entry (also referred to as matching entry, in short) is returned to the initiating hardware and/or software agent for further action and/or the translation may be updated.

If in step 1312 the verification fails and a valid matching translation in the PTLB is not found, then in step 1316 a replacement candidate entry in the PTLB is determined. The verification is performed using the pagelet states of the pagelets in the page. A PTLB entry is considered to not have a valid translation if all the pagelet states in the entry indicate their respective pagelets to be not present in memory (PNP) or marked invalid. The replacement candidate entry may be found using any number of suitable methods employing some replacement algorithms. Otherwise, a replacement method based on pagelet recency and usage may be used.

In step 1318, the replacement candidate entry is read, and the contents are used to update the corresponding page table entry associated with the replacement candidate entry. In step 1322 a new translation is created with the VPN, and optionally, comprising one or more associated access control identifier(s) such as OSID and/or ASID and/or PID and/or TID and/or LOGIN and/or PGID, and the associated physical page number (also known as physical frame number), and the associated pagelet states, and/or one or more associated page and/or pagelet attributes. In step 1322 the new translation is written into the candidate replacement entry that was found earlier in step 1316 after completion of the eviction of the replacement entry (candidate replacement entry). At this point the PTLB after the insertion process completion may send a completion message to the agent(s) involved in (and/or invoking) the translation insertion.

It is important to note that in some embodiments, some of the steps in method 1300 may be done concurrently or may be split or merged with other steps; some steps may be omitted or replaced or the method 1300 may be combined with other methods to achieve similar results. Further, it may be taught that the method 1300 may be implemented in software by a page handler and/or in hardware in some embodiment using a hardware pagelet walker 790.

Figure 14:
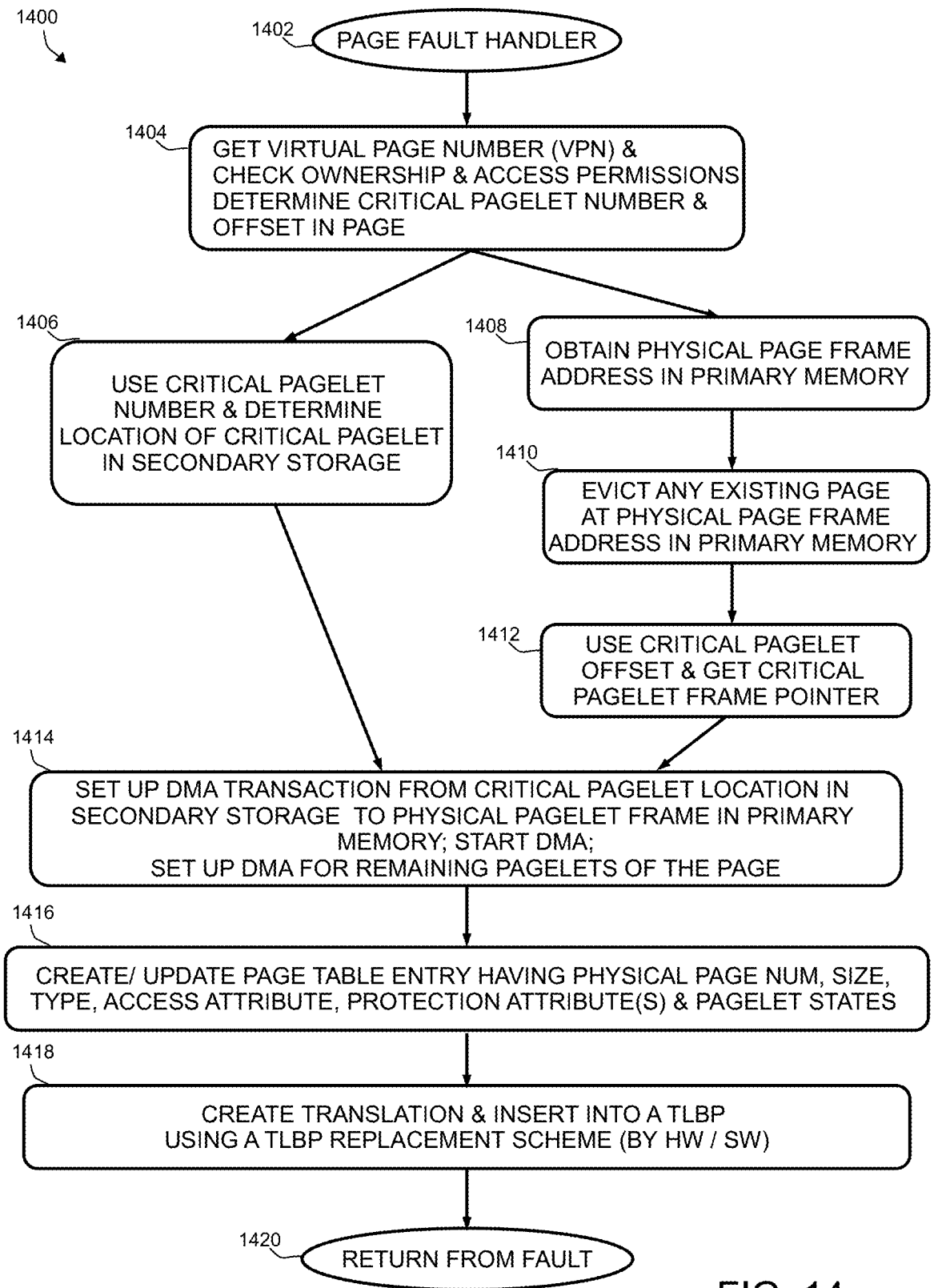
FIG. 14 illustrates an example of a method of handling a page fault on a page with pagelets, in accordance with one possible embodiment.

FIG. 14 illustrates an example of a method 1400 of handling a page fault on a page with pagelets, in accordance with one possible embodiment. Optionally, the method 1400 may be implemented in the context of any of the foregoing figures, or in any other environment.

In one example embodiment in FIG. 14, when a page fault occurs, method 1400 is employed to handle the page fault. In method 1400, a page fault handler is invoked in step 1402. In step 1404, a virtual page number is computed from the faulting virtual address; one or more page tables are checked to find the associated page table entry for the virtual page number, and the ownership and access permissions for the page are determined. This step may involve reading one or more associated access control identifier(s) such as an operating system identifier (OSID), and/or address space identifier (ASID), and/or process identifier (PID), and/or thread identifier (TID), and/or LOGIN, and/or process group identifier (PGID) from their respective register(s) and/or fields. Further, in step 1404, the virtual address is used to determine the critical pagelet number and the corresponding valid pagelet offset (critical pagelet offset) in the page. In step 1406, the critical pagelet number is used to determine the location of the critical pagelet in a secondary storage. This pagelet may be residing in a swap file and/or a buffer inside the memory (for e.g., main memory) allocated to a swap file or to a process file; this pagelet may reside in a flash drive and/or flash memory used as cache and/or the pagelet may reside in a cache in a secondary storage device and/or the pagelet may reside in the swap file in the secondary storage.

In step 1408, a physical page/frame address of a page/frame in memory is obtained. The physical page/frame address may be the address of a page that is evicted or designated to be replaced or the address may simply be an unoccupied page/frame in the memory that is available. In some embodiment, in step 1410, in some scenario if there is at least one DIRTY pagelet in the page to be evicted, the at least one DIRTY pagelet has to be transferred to secondary storage; if in step 1410, no DIRTY pagelets are found in the page to be evicted then the process of eviction speeds up since the pagelet states of the evicted page can simply be marked INVALID and/or PAGELET ABSENT and/or PAGELET NOT PRESENT as the case may be.

In step 1412, the (critical) valid pagelet offset is used to compute the critical pagelet frame pointer in memory. The valid pagelet offset is also used to compute the location of the critical pagelet in secondary storage. In step 1414, a DMA (direct memory access) transaction is set up from the location of the critical pagelet in secondary storage to the physical pagelet frame in memory. At this stage, the hardware and/or software may also set up a DMA transaction to bring in the other non-critical or semi-critical pagelets also from the secondary storage. In step 1416, the associated page table entry may be created and/or updated (if missing/absent), and this page table entry may comprise the physical page/frame number, size/mask, Type, access attribute(s), protection attribute(s), operation permission field and pagelet states.

In step 1418, a translation is created using the associated virtual page number and other attributes and identifiers and inserted into the one or more translation lookaside buffer(s) after the completion of the DMA transfer of the critical pagelet. If multiple DMAs are started, the associated pagelet states may be updated in the page table entry and/or in the PTLB entry(s) after their respective DMA transfers. The location of the entry to replace in a PTLB may be determined using a PTLB replacement scheme in hardware, or in software, or in hardware and software, in some embodiment. A method such as method 1300 may be used in some embodiments. In step 1420, in response to the completion of the transfer of at least one critical pagelet and insertion or update of a corresponding translation in a PTLB, the fault handler may return control to a faulting program.

Figure 15:
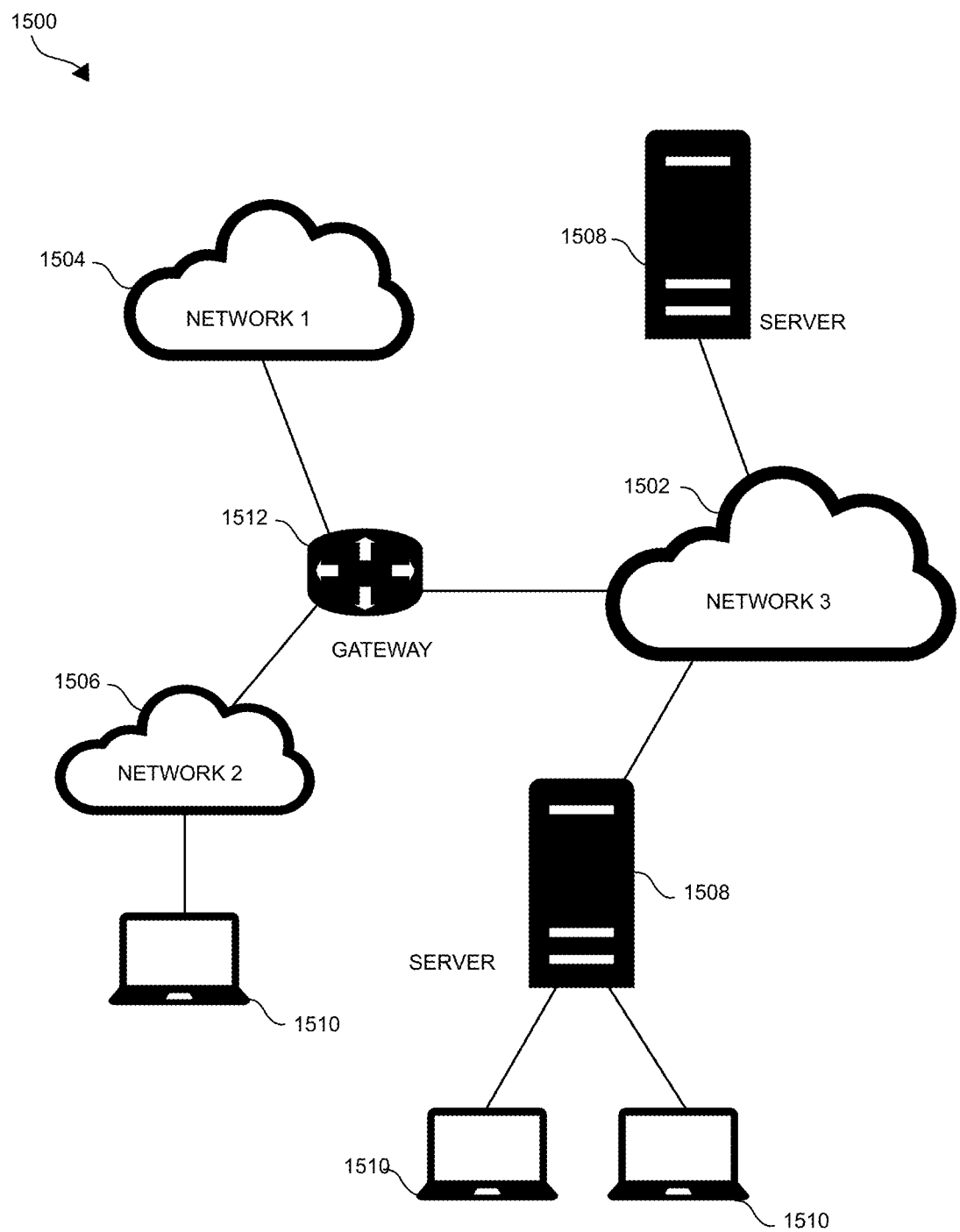
FIG. 15 illustrates a network architecture, in accordance with one possible embodiment.

FIG. 15 illustrates a network architecture 1500, in accordance with one embodiment. As shown, a plurality of networks, Network 1 1504, Network 2 1506, and Network 3 1502, are provided. In the context of the present network architecture, the networks, Network 1 1504, Network 2 1506, and Network 3 1502 may each take any form including, but not limited to a local area network (LAN), a wireless network, a wide area network (WAN) such as the Internet, peer-to-peer network, etc. Additionally, such networks may include a RFID communication between Client 1510 and another device (e.g. wearable, cloud, tag, etc.). Further, such networks may include any peer to peer (P2P) or device to device communication. In the context of the present description, a client may include an end user computer, a desktop computer, a laptop computer, a mobile device, a mobile phone, a tablet, a personal digital assistant (PDA), a television, a set-top box, etc.

Coupled to the Network 3 1502 are one or more Server 1508 which are capable of communicating over the Network 3 1502, as well as any other applicable network (e.g. Network 1 1504, Network 2 1506, etc.). Also coupled to Network 2 1506 and Network 3 1502 (or any other applicable network) and the Server 1508 is a plurality of Client 1510. Such Server 1508 and/or Client 1510 may each include a desktop computer, lap-top computer, hand-held computer, mobile phone, portable device, personal digital assistant (PDA), peripheral (e.g., printer, etc.), any component of a computer, and/or any other type of logic. In order to facilitate communication among Network 1 1504, Network 2 1506, Network 3 1502, and/or any other network, at least one Gateway 1512 is optionally coupled therebetween. In the context of the present description, cloud refers to one or more servers, services, and/or resources which are located remotely.

Figure 16:
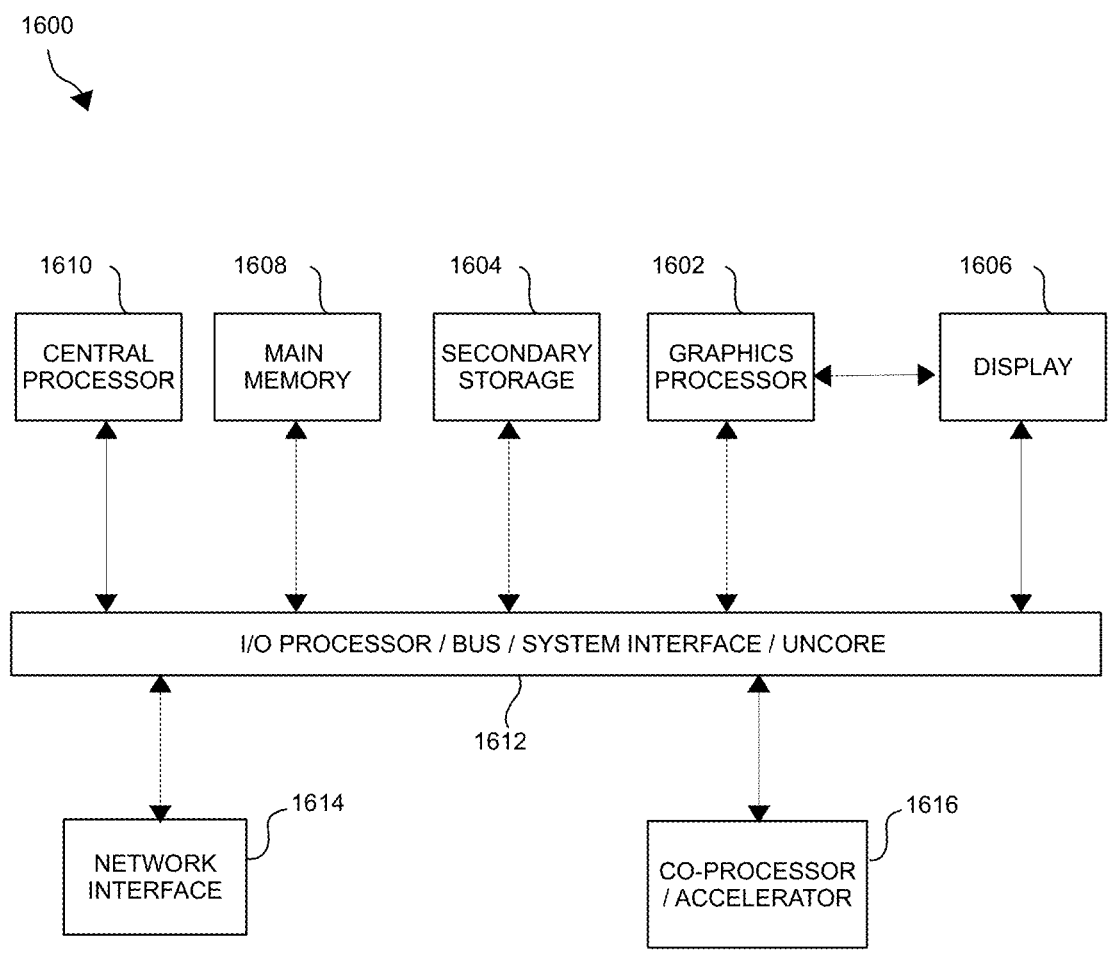
FIG. 16 illustrates an exemplary system, in accordance with one embodiment.

FIG. 16 illustrates an exemplary system 1600 in which the various architecture and/or functionality of the previous embodiment and/or subsequent embodiments may be implemented. As shown, a system 1600 is provided including at least one host Central Processor 1610 which is connected to a Communication Bus 1612. The system also includes a Main Memory 1608. Control logic (software) and data are stored in the Main Memory 1608 which may take the form of random access memory (RAM).

The system also includes a Graphics Processor 1602 and a Display 1606, e.g., a computer monitor. In one embodiment, the Graphics Processor 1602 may include a plurality of shader modules, a rasterization module, etc. Each of the foregoing modules may even be situated on a single semiconductor platform to form a graphics processing unit (GPU).

The system may also include a Secondary Storage 1604. The Secondary Storage 1604 includes, for example, at least one of a non-volatile memory (e.g., flash memory, magneto-resistive memory, ferroelectric memory, etc.), a hard disk drive, and a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the Main Memory 1608 and/or the Secondary Storage 1604. Such computer programs, when executed, enable the system to perform various functions. The Main Memory 1608, the Secondary Storage 1604 and/or any other storage are possible examples of computer-readable media.

In one embodiment, the architecture and/or functionality of the various previous figures may be implemented in the context of the host Central Processor 1610, Graphics Processor 1602, an integrated circuit (not shown) that is capable of at least a portion of the capabilities of both the host Central Processor 1610 and the Graphics Processor 1602, a chipset (i.e. a group of integrated circuits designed to work and sold as a unit for performing related functions, etc.), and/or any other integrated circuit for that matter. In some embodiments, a co-processor, or an accelerator 1616 may perform functions and/or implement various methods and implementations disclosed in any of the previous figures.

Additionally, the architecture and/or functionality of the various previous figures may be implemented in the context of a general computer system, a circuit board system, a game console system dedicated for entertainment purposes, an application-specific system, and/or any other desired system. For example, the system may take the form of a desktop computer, a laptop computer, a server computer, and/or any other type of logic. Still yet, the system may take the form of various other devices including, but not limited to, a personal digital assistant (PDA) device, a mobile device, a tablet device, a television, etc. In the context of the present description, a mobile device may include any portable computing device, including but not limited to, a laptop computer, a tablet computer, a desktop computer, a mobile phone, a media player, a camera, a television, and/or any other portable computing device.

The system may also comprise a network interface 1614 optionally, which enables the system to communicate with an external network. The network interface 1614 may be of any kind such as, for example, a wired network interface, a wireless network interface, an optical network interface, a Bluetooth interface, or a USB network interface, etc.; and further, more than one network interface(s) may be coupled to the system.

Further, while not shown, the system may be coupled to a network (e.g., a telecommunications network, local area network (LAN), wireless network, wide area network (WAN) such as the Internet, peer-to-peer network, cable network, etc.) for communication purposes. As an example, any of the Network 1 1504, Network 2 1506, and/or Network 3 1502 may be used for such coupling.

Of course, the various embodiments set forth herein may be implemented utilizing hardware, software, or any desired combination thereof. For that matter, any type of logic may be utilized which is capable of implementing the various functionality set forth herein.

While specific embodiments of the invention have been described, it is understood that the present invention is not intended to be limited only to such embodiments. Additionally, the scope of the preferred embodiment should be defined by the following claims and their equivalents. Moreover, any combination of the above-described elements in all possible variations thereof is encompassed unless otherwise indicated herein or otherwise clearly contradicted by context. Further, the use of the terms "a" and "an" and "the" and similar referents in the context of describing the subject matter (particularly in the context of the claims) are to be construed to cover both the singular and the plural, unless otherwise indicated herein or clearly contradicted by context. No language in the specification should be construed as indicating any non-claimed element as essential to the practice of the invention as claimed.

What is claimed is:

1. A system having a virtual memory comprising:
a memory having at least one page with pagelets, wherein individual ones of the pagelets are associated with a same page number; and
at least one page table comprising at least one first entry that comprises a virtual address to a physical address translation associated with the at least one page with pagelets, wherein the at least one first entry comprises a Type field to distinguish a next level page table from the at least one page with pagelets.

2. The system of claim 1, further comprising pagelet state indicators associated with the at least one first entry, and wherein individual ones of the pagelet state indicators are associated with respective individual ones of the pagelets.

3. The system of claim 2, where in the pagelet state indicators comprise pagelet validity indicators that are individually associated with respective individual ones of the pagelets.

4. The system of claim 2, wherein the pagelet state indicators comprise pagelet dirty indicators that are individually associated with respective individual ones of the pagelets.

5. The system of claim 1, wherein a physical page number is stored in the at least one first entry, and wherein the physical page number is used to compute a physical pagelet address.

6. The system of claim 1, wherein the pagelets are non-overlapping.

7. The system of claim 1, wherein the pagelets are arranged to be sequentially contiguous.

8. The system of claim 1, wherein the pagelets are transferred in a first order or in a second order wherein the first order and the second order are different.

9. The system of claim 1, comprising further pages, the further pages comprising further pagelets, wherein the further pagelets of different individual ones of the further pages are transferred in an interleaved order.

10. The system of claim 1, wherein the at least one page with pagelets contains at least one dirty pagelet having modified data, and wherein the at least one page with pagelets contains at least one unmodified pagelet which is not modified; and wherein the at least one dirty pagelet is transferred, and wherein the at least one unmodified pagelet which is not modified, is not transferred.

11. The system of claim 1, wherein the at least one first entry comprises a lock attribute to lock the at least one page with pagelets in the memory.

12. The system of claim 1, wherein there is a further pagelet containing a location addressed by an agent in a transaction, and wherein the further pagelet is identified as critical.

13. The system of claim 12, wherein the further pagelet identified as critical is transferred first in a page transfer prior to transferring pagelets that are not identified as critical.

14. The system of claim 1, wherein the memory is a physical memory holding at least one physical pagelet.

15. The system of claim 14, wherein the at least one physical pagelet is transferred between the physical memory and a secondary storage.

16. A system having a virtual memory system comprising:
a pagelet translation lookaside buffer that handles pages having pagelets, where in the pagelet translation lookaside buffer comprising at least one translation entry that comprises a virtual address to a physical address translation associated with at least one page, wherein the at least one translation entry further comprises a Type field to indicate that the at least one page comprises pagelets, wherein
the at least one translation entry comprises pagelet validity indicators that are individually associated with respective individual ones of the pagelets.

17. The system of claim 16, wherein the at least one translation entry is further associated with pagelet dirty indicators that are individually associated with respective pagelets.

18. The system of claim 16, wherein the virtual address to the physical address translation is associated with a physical page in a physical memory.

19. The system of claim 16, wherein the pagelets residing in a corresponding physical page are non-overlapping.

20. The system of claim 16, wherein the at least one translation entry comprises a lock attribute, and wherein the lock attribute when asserted, locks the at least one translation entry in the pagelet translation lookaside buffer, and wherein locking the at least one translation entry prevents the at least one translation entry from replacement.

21. The system of claim 16, wherein the pagelet translation lookaside buffer comprises a critical pagelet determiner which indicates a critical pagelet, wherein the critical pagelet contains a location addressed by an agent in a transaction.

22. The system of claim 16, wherein the pagelet translation lookaside buffer further comprising a pagelet state updater which updates a pagelet state of a critical pagelet.

23. The system of claim 16, implementing a method to evict a dirty page and write back a dirty pagelet to secondary storage, the method comprising:
presenting a virtual address of a page to evict and reading one or more page tables to get an associated page table entry comprising a physical page number, pagelet states and page attributes;
probing the pagelet translation lookaside buffer that handles pages with pagelets, to find a matching translation entry;
upon finding the matching translation entry, updating the pagelet states in the associated page table entry in the one or more page tables and invalidating the matching translation entry in the pagelet translation lookaside buffer;
checking pagelet states in the associated page table entry for dirty pagelets;
in response to finding the dirty pagelet, computing a physical pagelet address of the dirty pagelet;
setting up a direct memory access transaction to transfer the dirty pagelet to the secondary storage and starting the direct memory access transaction; and
returning a message in response to completion of the direct memory access transaction.

24. The system of claim 16, implementing a method to insert a translation in the pagelet translation lookaside buffer, the method comprising:
presenting a virtual page number of a page to insert and reading one or more page tables to get an associated page table entry comprising a physical page number, pagelet states and page attributes;
probing the pagelet translation lookaside buffer that handles pages having pagelets to find a matching translation entry;
in response to finding the matching translation entry, updating the matching translation entry;
when no matching translation entry is found, then finding a replacement candidate entry in the pagelet translation lookaside buffer, and updating pagelet states of a corresponding page table entry in the one or more page tables, the corresponding page table entry associated with the replacement candidate entry;
creating a new translation comprising the virtual page number, an associated access control identifier, the physical page number, the pagelet states, and the page attributes; and
writing the new translation into the replacement candidate entry in the pagelet translation lookaside buffer.

25. A method to probe a pagelet translation lookaside buffer, the method comprising:
- presenting a virtual address to the pagelet translation lookaside buffer that handles pages having pagelets, obtaining a virtual page number, and matching with one or more entries in the pagelet translation lookaside buffer to obtain a matching entry;
- reading one or more access control identifiers and a privilege level;
- checking pagelet states of the matching entry for a valid pagelet present, and checking for a pagelet hit or a pagelet miss;
- upon a pagelet hit, checking the one or more access control identifiers and privilege level against the matching entry and deciding to permit or deny access to the matching entry; and
- raising a protection failure when access to the matching entry is denied, or alternately when access is permitted, returning an entry number associated with the matching entry and matching entry contents.

26. The method of claim 25 further comprising:
reading data from a location, by:
- presenting the virtual address to probe the pagelet translation lookaside buffer that handles pages having pagelets and obtaining the matching entry;
- obtaining a valid pagelet offset, a location offset and a physical page number from the matching entry;
- computing a physical page address and using the physical page address to compute a physical location address by adding the valid pagelet offset, the location offset, and the physical page address;
- checking read permissions associated with the matching entry;
- raising an exception when failing to receive permission to read, or alternately, when permission to read is received, providing the physical location address to access the location;
- obtaining data from the location and returning data; and
- updating pagelet states in response to accessing the location.

27. The method of claim 25 further comprising:
writing data to a location, by:
- presenting the virtual address to probe the pagelet translation lookaside buffer that handles pages having pagelets and obtaining the matching entry;
- obtaining a valid pagelet offset, a location offset and a physical page number from the matching entry;
- computing a physical address by adding the valid pagelet offset, the location offset and the physical page number;
- checking write permissions associated with the matching entry;
- raising an exception when failing to receive the permission to write, or alternately, when permission to write is received, providing the physical address to access the location;
- writing data to the location; and
- updating pagelet states in response to accessing the location.

* * * * *